United States Patent [19]

Saito et al.

[11] Patent Number: 5,745,686
[45] Date of Patent: Apr. 28, 1998

[54] INFORMATION TRACING SYSTEM AND INFORMATION TRACING METHOD

[75] Inventors: Kazuo Saito; Juhei Nakagaki, both of Nakai-machi; Yasuko Toju, Tokyo; Noriyuki Kamibayashi, Nakai-machi, all of Japan

[73] Assignee: Fuji Xerox Co., Ltd., Tokyo, Japan

[21] Appl. No.: 658,376

[22] Filed: Jun. 5, 1996

[30] Foreign Application Priority Data

Jun. 7, 1995 [JP] Japan .................................. 7-140167
Apr. 1, 1996 [JP] Japan .................................. 8-079003

[51] Int. Cl.$^6$ ........................... G06F 13/00; H04L 9/32
[52] U.S. Cl. ................. 395/200.15; 395/200.11; 395/186; 395/187.01; 395/610; 395/772; 395/773; 395/421.06; 364/138; 364/282.4; 364/284.3; 364/284.4; 380/23; 380/4
[58] Field of Search .................. 395/200.15, 200.01, 395/200.03, 200.06, 200.11, 200.16, 200.18, 140, 610, 615, 609, 183.01, 183.07, 183.21, 183.22, 184.01, 185.01, 772–773, 776, 779, 421.06, 421.11; 364/138, 146, 514 R, 514 A, 514 B, 514 C, 550, 267, 282.4, 284.3–4, DIG. 1–2; 340/825.06, 825.15, 825.17, 825.36, 825.49; 345/22–24, 27, 112, 139; 379/34, 42, 90, 93, 100, 104, 122, 133, 136; 380/3, 4, 23

[56] References Cited

U.S. PATENT DOCUMENTS

| | | | |
|---|---|---|---|
| 5,220,655 | 6/1993 | Tsutsui | 395/200.11 |
| 5,339,361 | 8/1994 | Schwalm et al. | 380/23 |
| 5,347,272 | 9/1994 | Ota | 370/392 |
| 5,440,631 | 8/1995 | Akiyama et al. | 380/4 |
| 5,465,299 | 11/1995 | Matsumoto et al. | 380/23 |
| 5,499,331 | 3/1996 | Hayashi et al. | 395/774 |
| 5,535,388 | 7/1996 | Takeda | 395/701 |
| 5,619,570 | 4/1997 | Tsutsui | 380/4 |
| 5,634,010 | 5/1997 | Ciscon et al. | 395/200.15 |
| 5,638,514 | 6/1997 | Yoshida et al. | 395/200.11 |
| 5,649,085 | 7/1997 | Lehr | 395/140 |
| 5,649,218 | 7/1997 | Saito | 395/774 |

FOREIGN PATENT DOCUMENTS

| | | |
|---|---|---|
| A-2-236629 | 9/1990 | Japan . |
| A-2-297288 | 12/1990 | Japan . |
| A-4-268849 | 9/1992 | Japan . |
| A-5-63728 | 3/1993 | Japan . |

*Primary Examiner*—James P. Trammell
*Assistant Examiner*—Tuan Q. Dam
*Attorney, Agent, or Firm*—Oliff & Berridge, PLC.

[57] ABSTRACT

An information processing method and an information processing system for recording information concerning a distribution route of one information, thereby enabling the information distribution route to be traced later. Information held in an information holding section 11 has distribution history information held in an information label section. When information is sent from one information intervention system to another information intervention system, a distribution history write section 15 reads a system identifier from a system label section 14 and adds a sending history to the distribution history information of the information. When information is received from another information intervention system, likewise a reception history is added to the distribution history information of the information. A tracing result display section 16 fetches the distribution history information of specified information, carries out an analysis on it, and displays the analysis result in a predetermined display format. Seeing the display, the use can easily know the information distribution route, etc., later.

9 Claims, 25 Drawing Sheets

FIG. 1
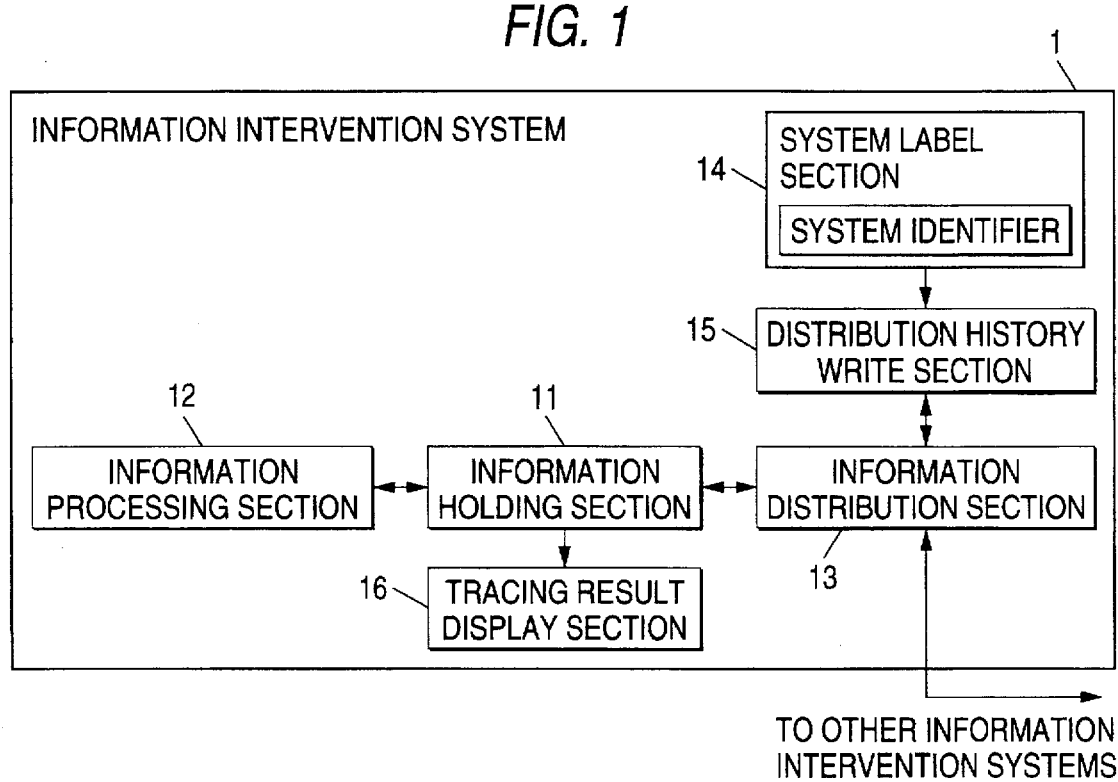
FIG. 2
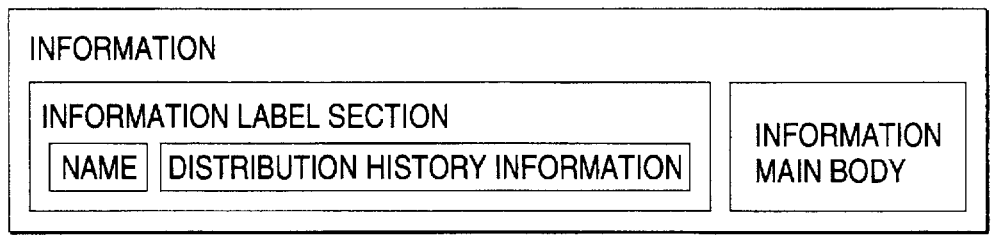
FIG. 3
| HISTORY TYPE (1 BIT) | SENDING/RECEPTION SYSTEM IDENTIFIER (8 BYTES) | TIME (7 BYTES) |
|---|---|---|
| 0 | 898345 | 1995031012090441 |
| 1 | 800287 | 1995031322233489 |
| 0 | 800287 | 1995031417455534 |
| ... | ... | ... |

FIG. 9

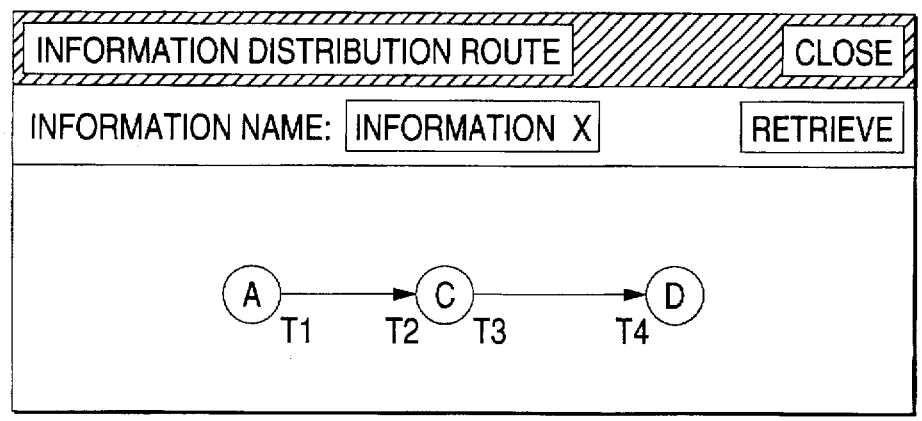

INFORMATION DISTRIBUTION ROUTE — CLOSE
INFORMATION NAME: INFORMATION X — RETRIEVE

FIG. 10

INFORMATION DISTRIBUTION ROUTE — CLOSE
INFORMATION NAME: INFORMATION X — RETRIEVE

| SENDING/RECEPTION | SYSTEM IDENTIFIER | TIME |
|---|---|---|
| SENDING | A | T1 |
| RECEPTION | C | T2 |
| SENDING | C | T3 |
| RECEPTION | D | T4 |

FIG. 11

INFORMATION DISTRIBUTION ROUTE — CLOSE
INFORMATION NAME: INFORMATION X — RETRIEVE

SOURCE SYSTEM IDENTIFIER: A

SENDING TIME: T1

| HISTORY TYPE (2 BITS) | SENDING/RECEPTION/EDIT SYSTEM IDENTIFIER (8 BYTES) | TIME (7 BYTES) |
|---|---|---|
| 2 | 898345 | - |
| 0 | 898345 | 1995031012090441 |
| 1 | 800287 | 1995031322233489 |
| 0 | 800287 | 1995031417455534 |
| 1 | 800515 | 1995031515300123 |
| 2 | 800515 | - |
| 0 | 800515 | 1995032008101805 |
| ... | ... | ... |

| HISTORY TYPE (2 BITS) | SENDING/RECEPTION/ EDIT SYSTEM IDENTIFIER (8 BYTES) | TIME (7 BYTES) | TARGET INFORMATION IDENTIFIER (8 BYTES) |
|---|---|---|---|
| 2 | 898345 | - | 898345-176 |
| 2 | 898345 | - | 898345-211 |
| 0 | 898345 | 1995031012090441 | - |
| 1 | 800287 | 1995031322233489 | - |
| 0 | 800287 | 1995031417455534 | - |
| 1 | 800515 | 1995031515300123 | - |
| 2 | 800515 | - | 800515-1345 |
| ... | ... | ... | |

| OPERATION | SYSTEM IDENTIFIER | TIME | INFORMATION IDENTIFIER |
|---|---|---|---|
| EDIT | A | T0' | a001 |
| EDIT | A | T0" | a007 |
| SENDING | A | T1 | DITTO |
| RECEPTION | B | T2 | DITTO |
| SENDING | B | T3 | DITTO |
| RECEPTION | C | T4 | DITTO |
| EDIT | C | T4' | c011 |

INFORMATION DISTRIBUTION ROUTE — CLOSE
INFORMATION NAME: INFORMATION X — RETRIEVE

FIG. 27
| HISTORY TYPE (1 BIT) | SENDING/RECEPTION USER IDENTIFIER (8 BYTES) | TIME (7 BYTES) |
|---|---|---|
| 0 | 23076 | 1995031012090441 |
| 1 | 890111 | 1995031322233489 |
| 0 | 890111 | 1995031417455534 |
| ... | ... | ... |
FIG. 28
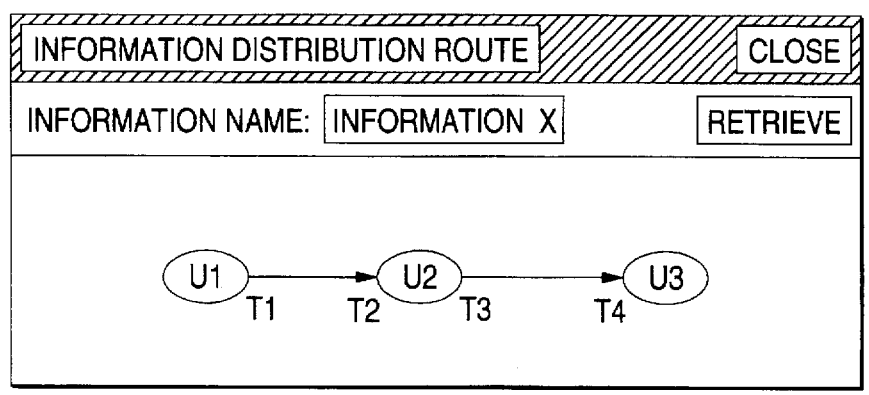
FIG. 29
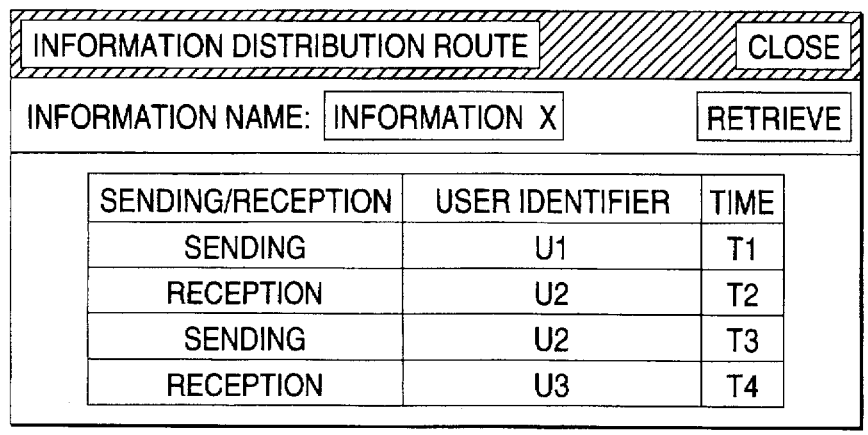

FIG. 38A

INFORMATION X DISTRIBUTION HISTORIES
(DATA SIZE = 5176 BYTES)

| SENDING SYSTEM IDENTIFIER (8 BYTES) | TIME (7 BYTES) |
|---|---|
| 898345 | 1995031012090441 |
| 800287 | 1995031322233489 |
| 850198 | 1995031417500809 |

FIG. 38B

INFORMATION Y DISTRIBUTION HISTORIES
(DATA SIZE = 2098 BYTES)

| SENDING SYSTEM IDENTIFIER (8 BYTES) | TIME (7 BYTES) |
|---|---|
| 800287 | 1995031122042509 |
| 898345 | 1995031209460826 |
| 850198 | 1995031417500809 |

FIG. 38C

INFORMATION Z DISTRIBUTION HISTORIES
(DATA SIZE = 10987 BYTES)

| SENDING SYSTEM IDENTIFIER (8 BYTES) | TIME (7 BYTES) |
|---|---|
| 898345 | 1995031012003409 |
| 800287 | 1995031508561098 |

FIG. 39

| SENDING SYSTEM IDENTIFIER (8 BYTES) | RECEIVING SYSTEM IDENTIFIER (8 BYTES) | REQUIRED TIME (7 BYTES) | SIZE (8 BYTES) | |
|---|---|---|---|---|
| 898345 | 800287 | 0 | 5167 | } INFORMATION X |
| 800287 | 850198 | 0000000310143048 | 5167 | |
| 850198 | me | 0000000019263320 | 5167 | |
| 800287 | 898345 | 0 | 2098 | } INFORMATION Y |
| 898345 | 850198 | 0000000011414317 | 2098 | |
| 850198 | me | 0000000218035983 | 2098 | |
| 898345 | 800287 | 0 | 10987 | } INFORMATION Z |
| 800287 | me | 0000000420553689 | 10987 | |

FIG. 40

| SENDING SYSTEM IDENTIFIER (8 BYTES) | RECEIVING SYSTEM IDENTIFIER (8 BYTES) | REQUIRED TIME (7 BYTES) | SIZE (8 BYTES) | NUMBER OF HISTORIES |
|---|---|---|---|---|
| 898345 | 800287 | 0 | 16154 (1) | 2 |
| 800287 | 850198 | 0000000310143048 | 5167 | 1 |
| 850198 | me | 0000000118451651 (2) | 7265 (3) | 2 |
| 800287 | 898345 | 0 | 2098 | 1 |
| 898345 | 850198 | 0000000011414317 | 2098 | 1 |
| 800287 | me | 0000000420553689 | 10987 | 1 |

(1) 5167 + 10987 = 16154
(2) (0000000019263320 + 0000000218035983) / 2 = 0000000118451651
(3) 5167 + 2098 = 7265

INFORMATION TRACING SYSTEM AND INFORMATION TRACING METHOD

BACKGROUND OF THE INVENTION

This invention relates to an information processing method and an information processing system capable of tracing an information distribution route, etc.

We are about to open an age of digitalizing all information and distributing it through networks with the recent digital information technology development, information highway initiative, etc. Distribution of various pieces of information such as images, moving pictures, voice, and programs as well as text information has already begun through network media such as internets and personal computer communication. Although information originators or issuers and receivers are distinguished clearly from each other with information media like conventional broadcasting, if such an age comes, all users will be both information originators (issuers) and receivers. Further, since digitalized information has a feature of easy copying, the information distribution range and speed will be accelerated by the users who copy and redistribute the information.

One of techniques for the user to distribute information on a computer network is an electronic mail system, wherein each user has a personal mail box. When one user transmits electronic mail to a specific user as the destination, the mail system transfers the information to the mail box of the destination user, who then takes out from his or her own mail box. The electronic mail system can be used to distribute one information to a number of persons in order; for example, user A sends one information to user B, who in turn sends the received information to user C.

The electronic mail transferred through the electronic mail system generally is made up of the two kinds of information: One is the information itself to be sent by the sender to the receiver, which contains images, moving pictures, voice, etc., as well as text information, and the other is information recorded by the electronic mail system as the electronic mail is transferred on the network, the recorded information containing the mail sender name, the transmission time of day, the receiver name, the reception time of day, etc. When the electronic mail system is used, information indicating the mail sender name, the transmission time of day, the receiver name, the reception time of day, etc., can be referenced to know the distribution route of the mail, whereby, for example, when illegal information such as programs into which computer viruses are mixed or information containing a violation of privacy is received, such steps to issue a warning to all persons receiving the illegal information or newly transfer valid information can be taken.

For example, an electronic mail system is described in Unexamined Japanese Patent Publication 4-268849, wherein at the node receiving electronic mail, information concerning the sender name and passed-through nodes added to the received electronic mail can be compared with information concerning the network configuration held in the node to see if the electronic mail sender name is false. In transfer of electronic mail in the electronic mail system, the sender prepares transmission and reception logs together with information to be sent to the receiver and transfers both as a unit to the receiver.

However, in addition to the electronic mail system, various routes exist as information distribution features, some of which do not record an information distribution history. For example, if information is simply copied from a storage of one person to a storage of another person, the route of distribution (in this case, copy) of the information is not recorded in the information because generally the copy function does not include a history recording function. In the above-mentioned electronic mail system, histories cannot be recorded for distribution routes other than the electronic mail system and such information distribution as copying is not recorded. Thus, the distribution route of the information cannot be known later. If the distribution route is not known, when illegal information is received, some action such as issuing a warning to the receivers receiving the information so far cannot be taken.

In an office information processing system described in Unexamined Japanese Patent Publication Hei 5-63728, control information indicating what processing can be performed after reception is added to electronic mail and history information on operation performed on received mail is stored. By referencing the history information, the sender can know whether or not transmitted electronic mail has been processed, for example. However, in the system, what route the information has been distributed through cannot be known from received electronic mail although the original sender of the received electronic mail can be known. Like the above-mentioned electronic mail system, the office information processing system does not consider any distribution route other than the electronic mail system. Thus, in the office information processing system, the distribution route of received information cannot be known.

Further, in an electronic document preparation/approval system with an electronic certification function described in Unexamined Japanese Patent Publication 2-297288, certification data created by a certification process at approval is registered in a certification logging file, thereby enabling a document approval state to be traced. Since the electronic document preparation/approval system enables the approval requester to know the current approval state, even if a document is distributed to a person who does not perform an approval process, the fact cannot be known. As with the electronic mail communication network, if information not related to approval is simply copied from a storage of one person to a storage of another person, the route of distribution (in this case, copy) of the information is not recorded and the distribution route of the information cannot be known later.

Further, in Unexamined Japanese Patent Publication Hei 2-236629, in a software development management system, jobs are executed according to the job standard and after the job termination, the manager enters histories of the jobs. The software development progress can be grasped by tracing the job histories. In this case, however, a history for information not related to developed software is not recorded either and when software is distributed without using the software development management system, no histories are left, thus the distribution route of the information cannot be known later.

SUMMARY OF THE INVENTION

It is therefore an object of the invention to provide an information processing method and an information processing system for recording information concerning a distribution route of one information so that the user cannot change it each time the information is distributed, thereby enabling the information distribution route to be traced later.

According to the invention, there is provided an information processing method comprising the steps of sensing information distribution from a distribution source to a distribution destination, adding a history related to the sensed information distribution to the distributed information for recording them, and analyzing a distribution route based on the recorded history.

According to the invention, there is provided an information processing system comprising means for sensing information distribution from a distribution source to a distribution destination, means for adding a history related to the information distribution sensed by the distribution sensing means to the distributed information for storing them, and means for analyzing a distribution route based on the history stored in the storage means.

According to the invention, there is provided an information processing system comprising means for editing information, means for sensing edit executed by the edit means, means for sensing information distribution from a distribution source to a distribution destination, means for adding a history related to the edit sensed by the edit sensing means to the edited information for storing them and adding a history related to the information distribution sensed by the distribution sensing means to the distributed information for storing them, and means for analyzing a distribution route and information change based on the edit and distribution histories stored in the storage means together with the information.

In the invention, in the information processing system, the distributed information contains an information label which is a label for the information, and the storage means stores the information label as the edit history.

In the invention, the information processing system further includes means for preparing an information label which is a label for the information, based on distributed information, and the storage means stores the information label prepared by the information label preparation means as the edit history.

According to the invention, there is provided an information processing system comprising means for sensing information distribution from a distribution source to a distribution destination, storage means for adding an identifier of the distribution source or destination to the information as a history related to the information distribution sensed by the distribution sensing means for storing them, and means for analyzing a distribution route based on the history stored in the storage means.

In the information processing system, the distribution sensing means can be adapted to sense information distribution when information is distributed from the distribution source, or when information is distributed to the distribution destination. Alternatively, the distribution sensing means can be adapted to sense information distribution when information is distributed from the distribution source and when information is distributed to the distribution destination.

Furthermore, the information processing system include analysis result display means, wherein the analysis means can totalize the whole distribution condition of information based on the histories and the analysis result display means can display the totalization result analyzed by the analysis means in visual form.

In view of the invention, when information distribution from a distribution source to a destination is sensed, a history related to the information distribution is added to the distributed information for recording them. Later, the recorded histories can be analyzed to know the distribution route. The distribution route is a concept also containing the information transmission source, the transmission route, the distribution range, the distributed information amount, etc., whereby various pieces of information can be provided; for example, the user can trace the source of his or her received information or know other users receiving the same information. For example, when receiving illegal information, the user can take some action such as giving a warning to the persons receiving the illegal information so far.

Further, edit histories together with distribution histories can be added to information for storing them. The stored edit and distribution histories are analyzed, whereby the change process of the information contents together with the information distribution route can be known, whereby route information concerning the information contents can be provided as a clue to knowing the change of the information contents, knowing the source about the information contents, etc.

Furthermore, in the information processing system, information labels are stored as histories related to edit, whereby the original information can be specified and can be used as a clue to knowing the previous contents of the received information.

Moreover, the distribution source or destination identifier is added to information as a history related to distribution, whereby a distribution route analysis can be easily carried out.

As in the invention, the analysis means totalizes the whole distribution condition of information based on the histories and the analysis result display means displays the totalization result in visual form, whereby the user can understand how the information was distributed, whereby he or she can know a point with a large information distribution amount, a point where information distribution is delayed, etc., and can take measures against it.

BRIEF DESCRIPTION OF THE DRAWINGS

FIG. 1 is a block diagram to show a first embodiment of an information processing system of the invention;

FIG. 2 is an illustration of an example of the format of information in the first embodiment of the information processing system of the invention;

FIG. 3 is an illustration of an example of distribution history information in the first embodiment of the information processing system of the invention;

FIG. 9 is an illustration of an example of display produced by the tracing result display section in the first embodiment of the information processing system of the invention;

FIG. 10 is an illustration of another example of display produced by the tracing result display section in the first embodiment of the information processing system of the invention;

FIG. 11 is an illustration of still another example of display produced by the tracing result display section in the first embodiment of the information processing system of the invention;

FIG. 27 is an illustration of an example of distribution history information in the fifth embodiment of the information processing system of the invention;

FIG. 28 is an illustration of a display example of a tracing result display section in the fifth embodiment of the information processing system of the invention;

FIG. 29 is an illustration of another display example of the tracing result display section in the fifth embodiment of the information processing system of the invention;

FIG. 38A–C are illustrations of an example of distribution history information in the sixth embodiment of the information processing system of the invention;

FIG. 39 is an illustration of an example of intermediate description converted from distribution history information in the sixth embodiment of the information processing system of the invention;

FIG. 40 is an illustration of an example of a route information table output from the route information totalization section in the sixth embodiment of the information processing system of the invention;

DETAILED DESCRIPTION OF PREFERRED EMBODIMENTS

Figure 4:
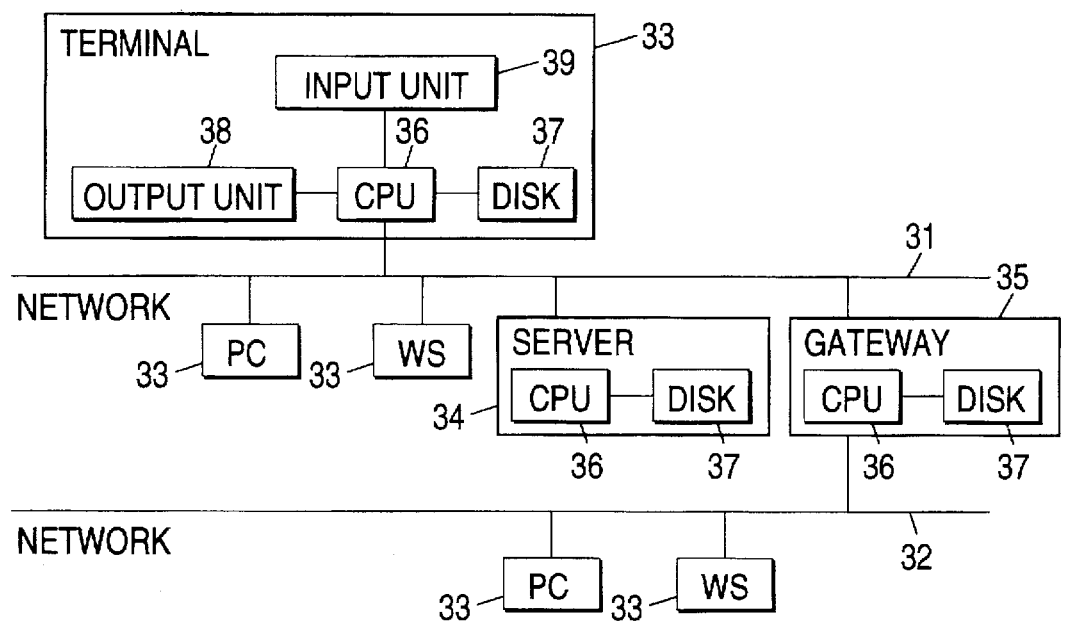
FIG. 4 is a hardware block diagram to show an example for providing the first embodiment of the information processing system of the invention.

Referring now to the accompanying drawings, there are shown preferred embodiments of the invention.

First embodiment

FIG. 1 is a block diagram to show a first embodiment of an information processing system of the invention. FIG. 2 is an illustration of an example of the format of information in the first embodiment of the information processing system of the invention. FIG. 3 is an illustration of an example of distribution history information in the first embodiment of the information processing system of the invention. In FIG. 1, numeral 1 is an information intervention system, numeral 11 is an information holding section, numeral 12 is an information processing section, numeral 13 is an information distribution section, numeral 14 is a system label section, numeral 15 is a distribution history write section, and numeral 16 is a tracing result display section.

The information intervention system 1 is a system for intervening in transfer of information. Specifically, it contains not only a gateway in a network or an exchange in a telephone network dedicated to information transfer, but also a system resultantly distributing information, such as an information processing system like a workstation connected to a network or personal computer in personal computer communication. It also contains a mail server function for distributing electronic mail, network communication, etc. Further, it contains an electronic information machine such as a disk drive for reading and writing information storage media such as hard disk or floppy disk; information copying, etc., between information storage media or within a single information storage medium corresponds to information distribution.

The information intervention system 1 has the information holding section 11, the information processing section 12, the information distribution section 13, the system label section 14, the distribution history write section 15, and the tracing result display section 16. Some of the functions of the information holding section 11, the information processing section 12, and the information distribution section 13 are contained in a conventional information intervention system.

The information holding section 11 holds information transferred from the information distribution section 13 or the information processing section 12. It also reads information in response to a request from the information distribution section 13 or the information processing section 12 and transfers the information thereto. In fact, the information holding section 11 is made of a memory, a magnetic disk unit, etc.

As shown in FIG. 2, information held in the information holding section 11 consists of an information label section and an information main body. The information label section contains an information name and distribution history information. Generally, in addition, attributes concerning the information, such as the information creator and creation date, may be stored in the information label section. In such a system charging for the service in response to the use amount of information, information on the charge is also stored in the information label section. The information main body is information having essential meanings and contains various kinds of information such as images, programs, texts, and moving pictures. Since the information label section has no meaning if it is separated from the information main body, generally it is encrypted so as not to be separated at the distribution time. If the information main body contents are rewritten from the state at some point in time, the rewritten information is handled as different information from the original information. That is, the information before being rewritten is not deleted and both the original information and the rewritten information exist separately. A new information label section is provided for the new information main body. In the new information label section, the information name differs from the name of the original information and the distribution history information is null.

The distribution history information consists of a set of the history type of sending or reception, the system identifier of an information intervention system sending or receiving information, and the information sending or reception time of day. Examples of the distribution history information are given below:

sent by A at T1;
received by B at T2;
sent by B at T3;
received by C at T4;
sent by B at T5.

where a symbol "sent" denotes that information was sent, a symbol "received" denotes that information was received, a symbol "by" is followed by a word representing the system identifier of the information intervention system sending or receiving information, and a symbol "at" is following by a word representing the information sending or reception time of day.

The distribution history information may be recorded as a character string as described above, but can also be recorded as binary data, an example of which is shown in FIG. 3. Each distribution history shown in the figure consists of the history type corresponding to "sent" or "received," the sending or reception system identifier, and the time of day. One row in the table represents one distribution history. For example, the information on the top row in the table means that the information intervention system having the identifier "898345" sent the information at 12 hours 9 minutes 4 seconds 41 on Mar. 10, 1995. In the description to follow, the representation "received by A at T1" is used for the history contents. To arrange history information in the operation occurrence order, new history information is added to the end.

Referring again to FIG. 1, the information processing section 12 processes the information stored in the information holding section 11. The information main body can be referenced and changed by the information processing section 12. For example, if the information intervention system 1 is a workstation or a personal computer, it performs various types of processing such as document preparation for the user to prepare a document in an interactive mode. When the information main body contents are changed, the information processing section 12 gives an information label section different from that of the original information to the changed information main body. In the information label section, the information name differs from the name of the original information and the distribution history information is null.

The information distribution section 13 transfers (sends and receives) information to and from other information intervention systems 1. In fact, for example, it is made of a network interface, etc., for transmitting and receiving information to and from other information intervention systems via a network.

When receiving information from another information intervention system 1, the information distribution section 13 performs the following operation: After receiving information from another information intervention system 1, the information distribution section 13 transfers the received information together with a word meaning "reception" to the distribution history write section 15. The information processed by the distribution history write section 15 is returned to the information distribution section 13, which then receives the information and transfers it to the information holding section 11.

When sending information from another information intervention system 1, the information distribution section 13 performs the following operation: After receiving information to be sent to another information intervention system 1 from the information holding section 11, the information distribution section 13 transfers the received information together with a word meaning "send" to the distribution history write section 15. The information processed by the distribution history write section 15 is returned to the information distribution section 13, which then receives the information and transfers it to the target information intervention system 1.

The system label section 14 holds a system identifier for uniquely identifying the information intervention system 1. It transfers system identifier information in response to a request from the distribution history write section 15. For example, the system identifier is given when the information intervention system is manufactured, and will not be changed later. Alternatively, when the system is configured, a unique system identifier may be given. The system identifier need not be seen from the information intervention system user.

The distribution history write section 15 receives the information to be sent or the received information and the word meaning "send" or "reception" from the information distribution section 13, adds history information concerning the present sending or reception to the distribution history information contained in the information label section of the received information, and transfers the changed information to the information distribution section 13. It also holds a clock.

The information added to the distribution history information is obtained as follows: The history type is determined by the word meaning "send" or "reception" transferred from the information distribution section 13. When the word meaning "send" is received from the information distribution section 13, "sent" is used; when the word meaning "reception" is received from the information distribution section 13, "received" is used. The system label section 14 is searched for the system identifier of the information intervention system to or from which the information is sent or received. The current time of day is determined by the clock held in the distribution history write section 15.

The tracing result display section 16 reads the user-specified information from the information holding section 11 as requested by the user, and lists the information intervention systems through which the information was passed, based on the distribution history information contained in the information label section of the information.

FIG. 4 is a hardware block diagram to show an example for providing the first embodiment of the information processing system of the invention. In the figure, numerals 31 and 32 are networks, numeral 33 is a terminal, numeral 34 is a server, numeral 35 is a gateway, numeral 36 is a CPU, numeral 37 is a disk, numeral 38 is an output unit, and numeral 39 is an input unit. The example shown in FIG. 4 is made up of machines connected through some communication means, such as the terminals 33 of workstations, personal computers, etc., and the server 34 connected through communication means such as the networks 31 and 32 and the gateway 35 for connecting the networks. The terminals 33 are made of general workstations, personal computers, etc., each of which consists of a CPU 36, a disk 37, an output unit 38 such as a display, and an input unit such as a keyboard and a mouse. The server 34 and the gateway 35 are also general machines each consisting of a CPU 36, a disk 37, etc. The machines need not always be connected to the network and may be connected thereto only when necessary. For example, a portable personal computer or the like normally is used on a standalone basis and when necessary, is connected to the network by a telephone line, Ethernet, etc. The information intervention systems 1 can be related to all or some of the machines shown in FIG. 4.

Next, the operation in the first embodiment of the information processing system of the invention will be outlined. In the invention, histories concerning distribution of information transferred by the information intervention systems are recorded in the distribution history information in the information. Various analyses concerning distribution such as the information distribution routes and range, the distributed information amount, etc., are carried out based on the distribution histories recorded in the distribution histories recorded in the distribution history information, whereby one information can also be traced, for example.

Figure 5:
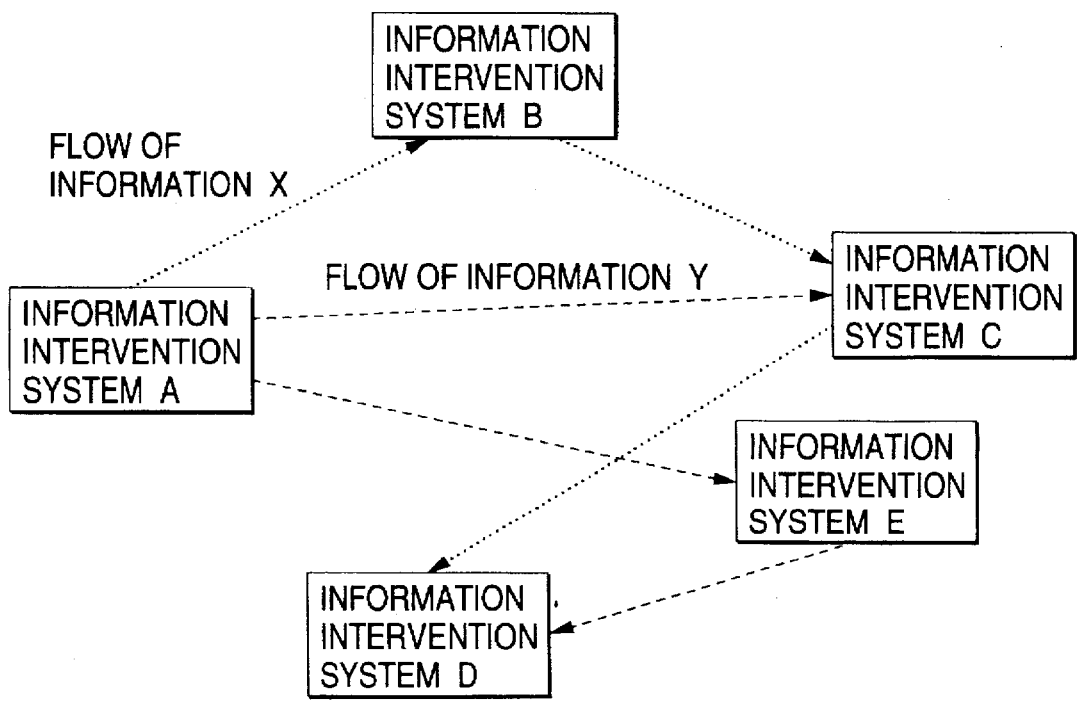
FIG. 5 is an illustration of an example of information flows in the first embodiment of the information processing system of the invention.

FIG. 5 is an illustration of an example of information flows in the first embodiment of the information processing system of the invention. It shows five information intervention systems A–E and indicates how information X and information Y are distributed. How information X is distributed is indicated by dotted lines; it is distributed from information intervention system A to information intervention system B to information intervention system C to information intervention system D. How information Y is distributed is indicated by broken lines; it is distributed from information intervention system A to information intervention system C on one path and to information intervention system E to information intervention system D on another path. Whenever such information transfer is executed, a distribution history is recorded in the distribution history information in the information. When the user gives an analysis command at some point in time, the distribution routes, etc., of the information are analyzed from the distribution histories recorded as the distribution history information at the point in time.

Although the information intervention system 1 in the embodiment can reference, change, and distribute information, only information distribution histories are recorded in the distribution history information in the information. In the embodiment, when the information main body contents are rewritten from the state at some point in time, the rewritten information is handled as different information from the original information. The distribution history information in the rewritten information does not contain that in the former information.

Figure 6:
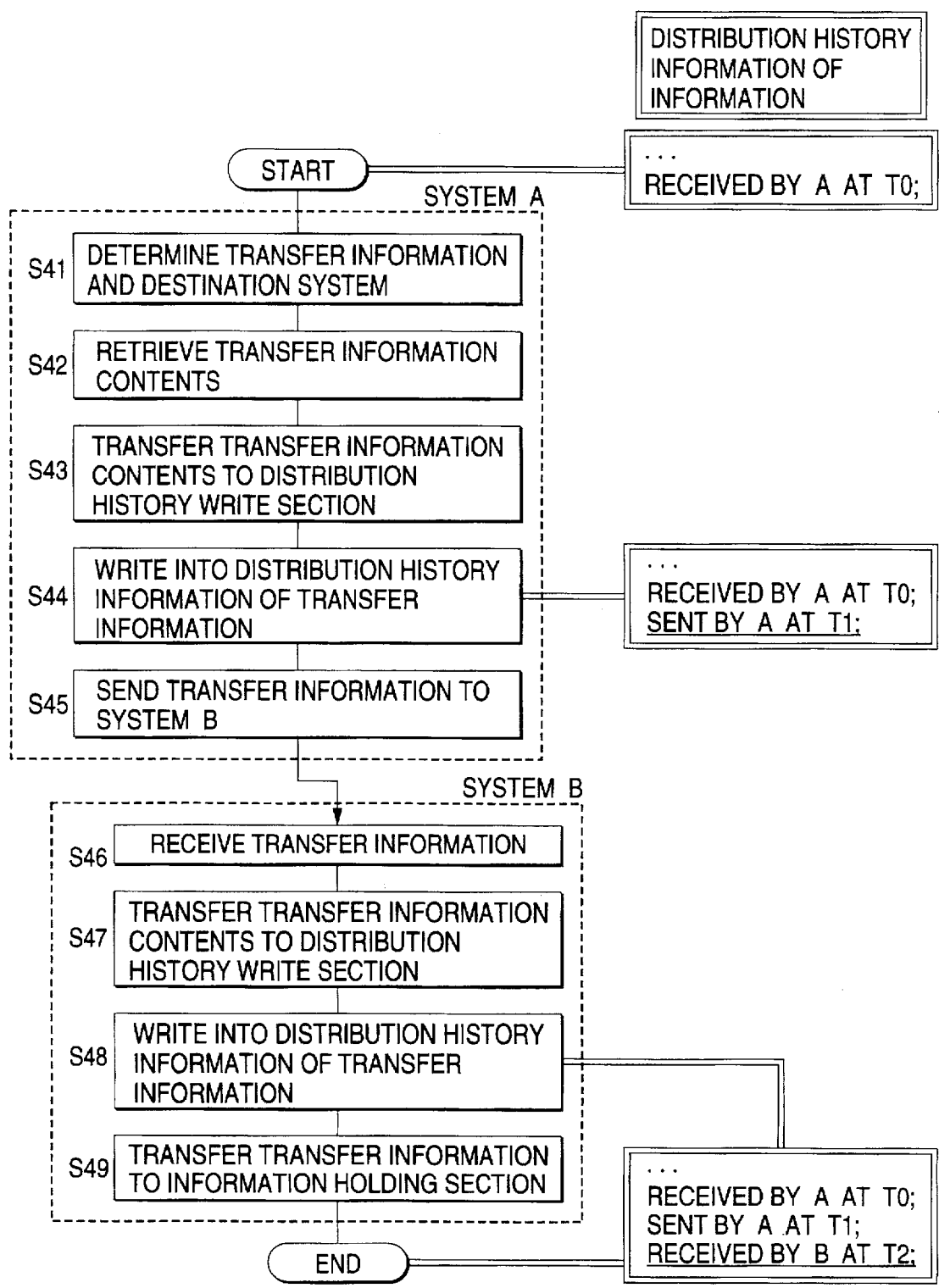
FIG. 6 is a flowchart to show an example of the operation of an information intervention system in the first embodiment of the information processing system of the invention
Figure 7:
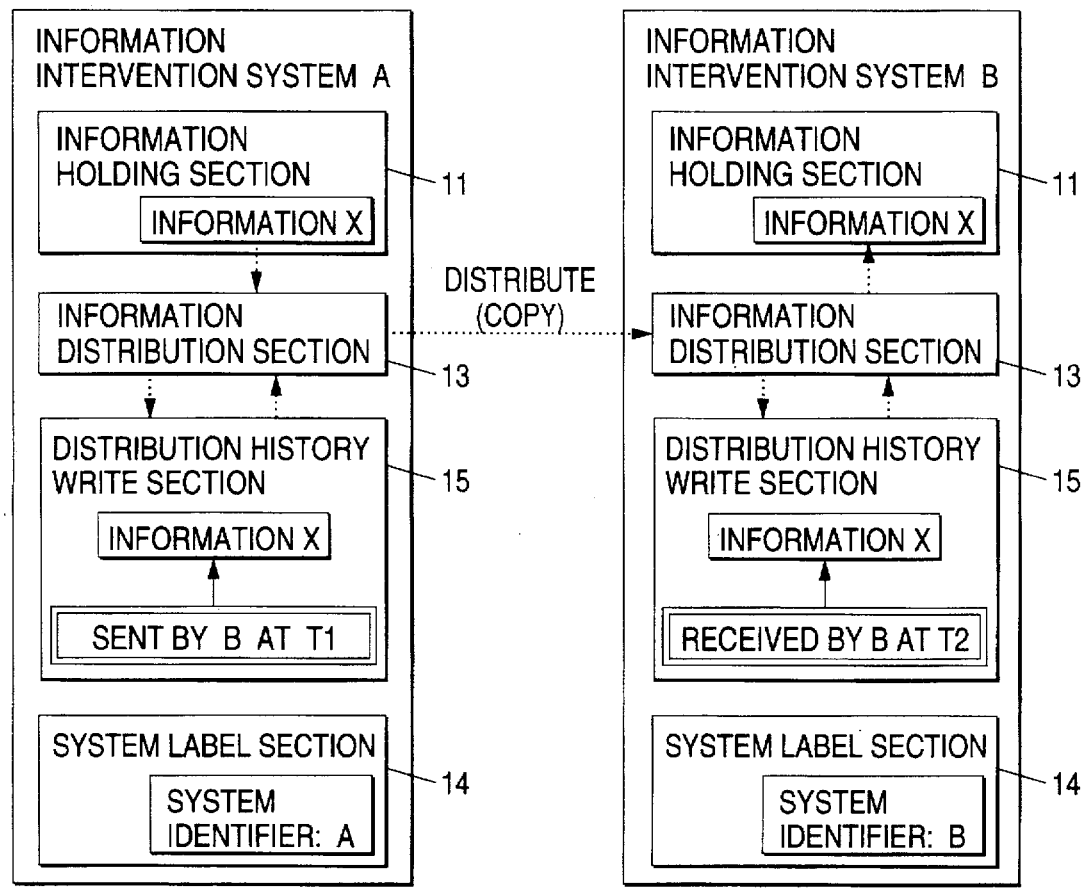
FIG. 7 is an illustration for recording histories in the first embodiment of the information processing system of the invention.

FIG. 6 is a flowchart to show an example of the operation of the information intervention system in the first embodiment of the information processing system of the invention. FIG. 7 is an illustration for recording histories in the first embodiment of the information processing system of the invention. In the description to follow, the information intervention system which sends information will be called the system A, the information intervention system which receives information will be called the system B, and transferred information will be called transfer information. FIG. 6 shows how the distribution history information contents change in addition to the operation flowchart. In the description of the distribution history information in FIG. 6, the underscore denotes new history information added at the step. T0, T1, and T2 are in time sequence. In FIG. 7, transfer information flows are indicated by dotted arrow lines along the operation shown in FIG. 6.

In the initial state,
received by A at T0;
is recorded at the end of the distribution history information in the information. At step S41, the information processing section 12 of the system A transfers the name of the transfer information and the system identifier of the information intervention system to which the information is to be sent to the information holding section 11 of the system A.

At step S42, the information holding section 11 of the system A receives the name of the transfer information and the system identifier of the information intervention system to which the information is to be sent from the information processing section 12 of the system A, reads the transfer information contents based on the name, and transfers the read transfer information contents and the destination system identifier to the information distribution section 13 of the system A.

At step S43, the information distribution section 13 of the system A receives the transfer information contents and the destination system identifier from the information holding section 11 of the system A, and transfers the transfer information and a word meaning "send" to the distribution history write section 15 of the system A.

At step S44, the distribution history write section 15 of the system A receives the transfer information contents and the word meaning "send" from the information distribution section 13 of the system A. It reads the system identifier of the system A from the system label section 14 of the system A and adds history information consisting of the history type sending, the system identifier of the system A, and the time of day to the distribution history information in the information label section of the transfer information. For example, the history information sent by A at T1;

is newly written into the distribution history information. The distribution history write section 15 transfers the transfer information into which the new history information is written to the information distribution section 13 of the system A.

At step S45, the information distribution section 13 of the system A receives the transfer information from the distribution history write section 15 of the system A and sends the transfer information to the destination information intervention system having the system identifier received from the information holding section 11 of the system A. The transfer information can be sent in the conventional techniques and therefore will not be discussed in detail here.

At step S46, the information distribution section 13 of the system B receives the transfer information sent from the system A. At step S47, it transfers the transfer information and a word meaning "reception" to the distribution history write section 15 of the system B.

At step S48, the distribution history write section 15 of the system B receives the transfer information contents the word meaning "reception" from the information distribution section 13 of the system B. It reads the system identifier of the system B from the system label section 14 of the system B and adds history information consisting of the history type reception, the system identifier of the system B, and the time of day to the distribution history information in the information label section of the transfer information. For example, the history information received by B at T2;

is newly written into the distribution history information. The distribution history write section 15 transfers the transfer information into which the new history information is written to the information distribution section 13 of the system B.

At step S49, the information distribution section 13 of the system B receives the transfer information from the distribution history write section 15 of the system B and transfers the transfer information to the information holding section 11 of the system B.

Through such a process, distribution histories are written into the distribution history information in the information in order. In the example shown in FIGS. 6 and 7, the information is distributed only from the system A to the system B; each time information is distributed between information intervention systems, distribution histories are added as described above. For example, assume that information X is distributed from information intervention system A to B to C to D in order, as shown in FIG. 5. When the information distribution section 13 of the information intervention system D receives the information X from the information intervention system C, the following distribution history information is held in the information label section of the information X:

sent by A at T1;
received by B at T2;
sent by B at T3;
received by C at T4;
sent by C at T5;
Further, in the information intervention system D, the distribution history indicating reception of the information X received by D at T6;

is added as the distribution history information of the information X.

Figure 8:
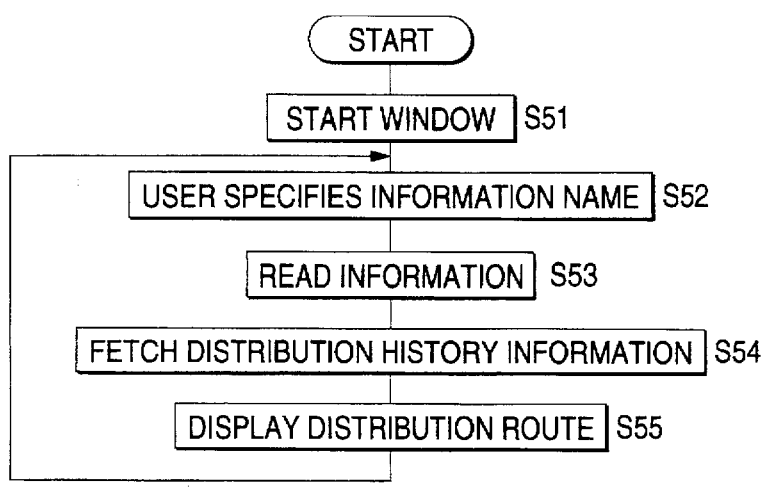
FIG. 8 is a flowchart to show an example of the operation of a tracing result display section in the first embodiment of the information processing system of the invention.

FIG. 8 is a flowchart to show an example of the operation of the tracing result display section 16 in the first embodiment of the information processing system of the invention. For the user to know an information distribution route, the tracing result display section 16 displays the distribution route, for example, by the following operation: First, at step S51, the user displays a window of the tracing result display section 16 of the information intervention system 1. At step S52, he or she enters the name of the information whose distribution route is to know in the window of the tracing result display section 16 and presses a RETRIEVE button. At step S53, the tracing result display section 16 reads the contents of the user-specified information from the information holding section 11. At step S54, it fetches distribution history information from within the information label section of the received information. At step S55, the tracing result display section 16 displays the distribution history information for the user.

FIGS. 9 to 11 are illustrations of examples of display produced by the tracing result display section 16 in the first embodiment of the information processing system of the invention. A CLOSE button for closing the window, an information name input area, and a RETRIEVE button are displayed on the top of the window of the tracing result display section 16. The user enters the name of the information whose tracing result is to know in the input field to the right of the INFORMATION NAME indication. The user presses the RETRIEVE button, whereby the information is read from the information holding section 11 and the distribution history information in the information is analyzed. Here, assume that the user is to know the distribution route of information X and enters information X as the information name. After entering the information name, he or she presses the RETRIEVE button. Since the RETRIEVE button is a virtual button, the user can click a mouse button on the position of the RETRIEVE button, for example.

The information X is sent from the information intervention system A to the information intervention system C at the time T1, the information intervention system C receives the information X at the time T2 and sends it to the information intervention system D at the time T3, and the information intervention system D receives the information at the time T4. For example, the distribution histories sent by A at T1;
received by C at T2;
sent by C at T3;
received by D at T4;

are recorded in the distribution history information of the information X.

In the example shown in FIG. 9, such a distribution route is represented by nodes and arcs. The nodes denote the information intervention systems. The arcs indicate information distribution; the starting end denotes the sender and the terminating end denotes the receiver. The sending time and reception time are displayed near the starting and terminating ends of the arcs. Such graphical distribution route display enables the user to know the distribution route of the information X in visual form. As shown in FIG. 10, the distribution route of the information X can also be displayed in the table format. Further, as shown in FIG. 11, only the first sender of the information can also be displayed without displaying the information distribution route, whereby when the user wants to know only the information source, he or she need not see the needless information of the distribution route. In addition, various display forms are available. The information processing system can be configured to as to enable the user to select the display forms. Further, the tracing result can also be output on various output units such as a printer in addition to the display.

In the first embodiment, the distribution history contents written into the distribution history information in the information may be other than the above-mentioned form. For example, before information is sent, the distribution history write section 15 of the information intervention system sending the information writes the identifiers of the information sending and receiving systems and the time of day. The distribution history write section 15 of the information intervention system receiving the information does not write anything. That is, at step S48 of the flowchart shown in FIG. 6, nothing can be written into the distribution history information. Alternatively, after information is received, the distribution history write section 15 of the information intervention system receiving the information writes the identifiers of the information sending and receiving systems and the time of day. The distribution history write section 15 of the information intervention system sending the information does not write anything. That is, at step S44 of the flowchart shown in FIG. 6, nothing can be written into the distribution history information.

Alternatively, when information is first sent, the system identifier of the information intervention system sending the information and the time of day are written. After this, when information is received, the system identifier of the information intervention system receiving the information and the time of day are written into the distribution history information and when the information is sent, nothing can be written. In this case, the information intervention system sending the information needs to determine whether or not the information is first sent. For example, whether or not some history is written in the distribution history information is checked and if no histories are written, it is determined that the information is first sent, and a distribution history at the sending time is written; if a history is written, it is not determined that the information is first sent, and a distribution history at the sending time is not written.

If a distribution history is added as distribution history information in the information label section each time information is distributed, the distribution history information increases and such an inconvenience of taking time in transmitting the information can occur. Then, such a problem can be avoided by always setting the distribution history information to a given size or less. To do this, for example, the following method is possible: The distribution history write section 15 of the information intervention system 1 holds the maximum permissible value of the distribution history information size, such as the number of characters. When the distribution history write section 15 rewrites the distribution history information, namely, at steps S44 and S48 of the flowchart in FIG. 6, it determines whether or not the distribution history information exceeds the maximum permissible value of the distribution history information size. If the distribution history information exceeds the maximum permissible value, the distribution history information size is lessened. After this, distribution histories concerning the present sending and reception are added. If the distribution history information does not exceeds the maximum permissible value, distribution histories concerning the present sending and reception are simply added. To lessen the distribution history information size, the distribution information concerning the earliest sending or reception is converted into compression format or if the distribution history information still exceeds the maximum permissible value after compression, it may be deleted, etc. For example, to always enable information sourch display as shown in FIG. 11, when old distribution histories are deleted from the distribution history information, the information concerning the first sending is not deleted and the subsequent information may be deleted. Second embodiment Second Embodiment Next, a second embodiment of the information processing system of the invention will be discussed. In the first embodiment, histories related only to information distribution are recorded. When the information main body contents are changed, the distribution history information of the information is made null. In such a configuration, if a large number of persons add a change to one information in such a manner that they write comments into a circular document, who received or sent the document before writing comments is not recorded in the distribution history information in the information label section of the information to which the change is added. Then, the second embodiment records an information change history together with an information distribution history in the distribution history information in the information. In the embodiment, when the information main body contents are rewritten from the state at some point in time, the rewritten information is handled as information which is different from the original information, but related to the original information contents. Specifically, the distribution history information in the rewritten information contains that in the former information, whereby if the contents of the information are changed in the distribution process, who sent and received the information and its original information can be seen.

Figures 12, 13:
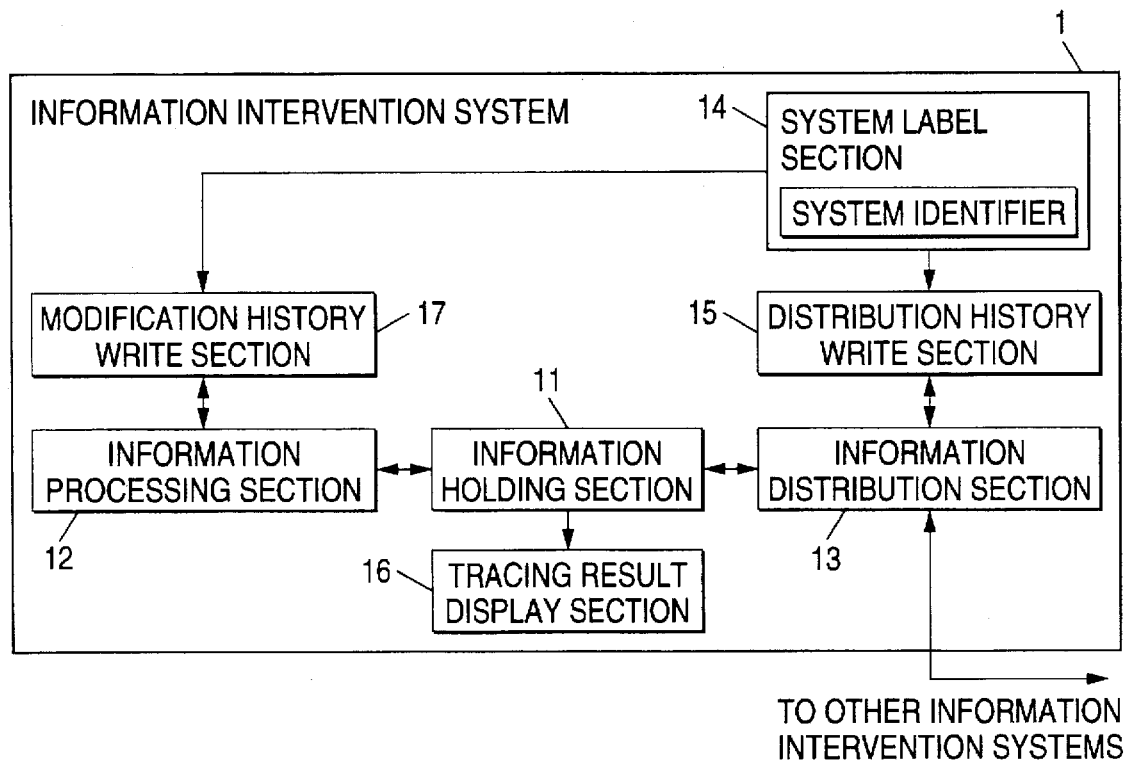
FIG. 12 is a block diagram to show a second embodiment of the information processing system of the invention.
FIG. 13 is an illustration of an example of distribution history information of information in the second embodiment of the information processing system of the invention.

FIG. 12 is a block diagram to show the second embodiment of the information processing system of the invention. Sections identical with or similar to those previously described with reference to FIG. 1 are denoted by the same reference numerals in FIG. 12 and will not be discussed again. In FIG. 12, numeral 17 is a modification history write section. An information intervention system 1 in the second embodiment is the same as that in the first embodiment in configuration except that it further includes the modification history write section 17, as shown in FIG. 12.

An information processing section 12 can reference and change an information main body. When the information main body contents are changed, the information processing section 12 gives an information label section to the changed information main body. In the information label section, the information name differs from the name of the original information. The distribution history information of the original information is copied to the distribution history information of the changed information.

When the information processing section 12 changes the information main body contents, the changed information contents are once transferred to the modification history write section 17. The information processing section 12 receives the information whose distribution history information is changed from the modification history write section 17 and transfers the information to an information holding section 11. The changed information main body and its attendant information label section are stored in the information holding section 11.

The modification history write section 17 receives information from the information processing section 12 and reads a system identifier from a system label section 14. If an edit history, which is a change history of the information main body contents in the information intervention system 1, does not exist at the end of the distribution history information in the information label section, the modification history write section 17 adds a pair of the history type indicating the change in the information contents and the identifier of the information changing system to the distribution history information. The modification time of day can also be recorded. Then, the modification history write section 17 transfers the information to the information processing section 12.

When the distribution history information is displayed on a tracing result display section 16, a change history as well as sending and reception histories can be displayed.

FIG. 13 is an illustration of an example of the distribution history information of information in the second embodiment of the information processing system of the invention. When the information main body contents are rewritten from the state at some point in time, the rewritten information is handled as information which is different from the original information, but related to the original information contents. This means that in the embodiment, the information before being rewritten is not deleted and both the original information and the rewritten information exist separately. In a new information label section given to the new information main body, the information name differs from the name of the original information, but the distribution history information contains all history information of the original information.

In the embodiment, in addition to "sending" and "reception," "edit" is contained in the history type in the distribution history information. The "edit" denotes that the information main body contents are changed. The history information concerning edit consists of the history type ("edit") and a system identifier. In the example, the time of day is not contained. When the changed information main body is stored in the information holding section 11, the history information representing the edit is added to the distribution history information in the information label section. However, if the information main body contents are changed twice or more in one system, no history is written into the distribution history information at the second changing time or later when the changed information main body is stored in the information holding section 11.

For example, assume that information is prepared in information intervention system A and is distributed via information intervention system B to information intervention system C, then is modified in the information intervention system C and is furthermore distributed to another information intervention system. In this case, for example, the following sending, reception, and edit histories are recorded as the distribution history information in the information:

modified by A;
sent by A at T1;
received by B at T2;
sent by B at T3;
received by C at T4;
modified by C;
sent by C at T5;

where "modified" denotes that the information main body contents were changed. Other notational conventions are the same as those in the first embodiment.

The distribution history information can be recorded as binary data. The example shown in FIG. 13 is an example where the distribution history information is recorded as binary data. To represent an edit history in addition to sending and reception histories, two bits are assigned to the history type (0, 1, or 2). In the example, the time of day is not recorded in the edit histories. In FIG. 13, the rows are provided in a one-to-one correspondence with the histories. For example, the top row corresponds to an "edit" history, indicating that the information was edited in the information intervention system having the system identifier "898345."

Figure 14:
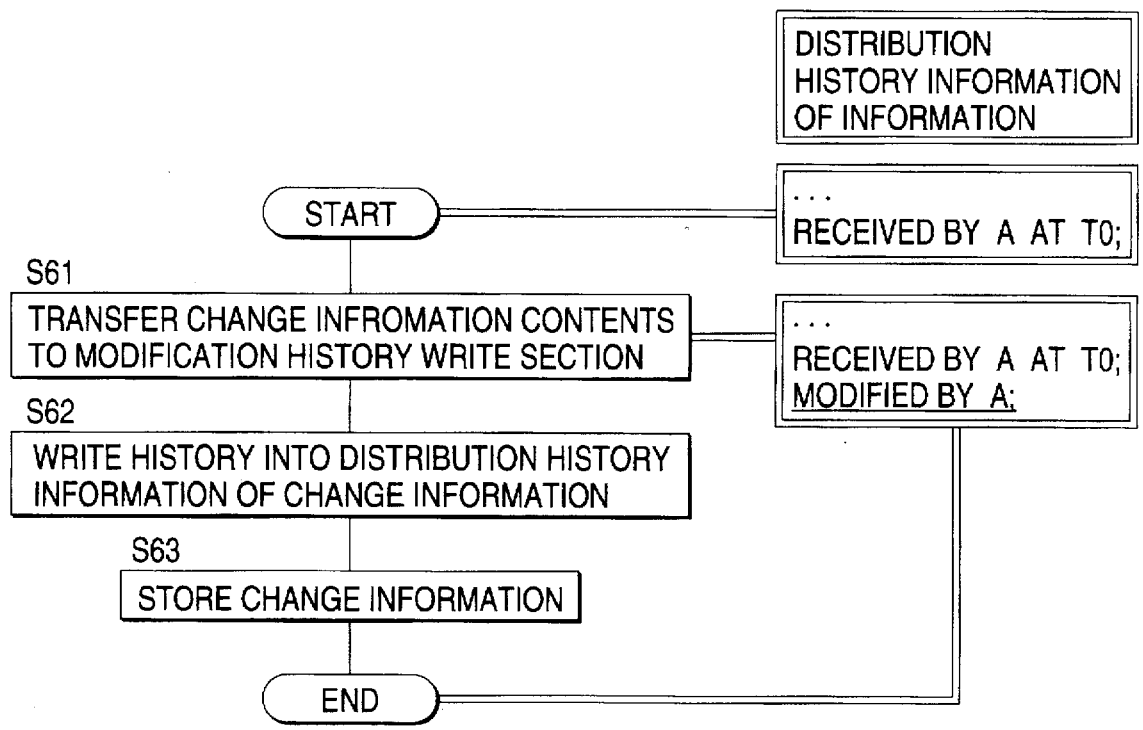
FIG. 14 is a flowchart to show an example of the information storage operation in the second embodiment of the information processing system of the invention.

Next, the operation in the second embodiment of the information processing system of the invention will be discussed. The operation of information transfer and tracing result display is the same as that in the first embodiment and therefore will not be discussed again. FIG. 14 is a flowchart to show an example of the information storage operation in the second embodiment of the information processing system of the invention. FIG. 14 shows how the distribution history information contents change in addition to the operation flowchart. In the description of the distribution history information in FIG. 14, the underscore denotes new history information added at the step. Hereinafter, the information whose information main body contents were changed will be called change information.

Assume that in the initial state, the following reception history received by A at T0;

is recorded at the end of the distribution history information of information. Assume that an instruction is given for changing the information main body of the information in the information processing section 12 and then storing the information in the information holding section 11. At step S61, the information processing section 12 transfers the changed information main body and the information label section of the information to the modification history write section 17.

At step S62, the modification history write section 17 receives the change information from the information processing section 12 and reads a system identifier from the system label section 14. If a change history in the information intervention system 1 does not exist in the distribution history information in the information label section of the received change information, the modification history write section 17 adds an edit history consisting of the history type indicating the changing and the system identifier to the distribution history information. The example shown in FIG. 14 indicates modification executed in the information intervention system A, and the edit history modified by A;
is added to the distribution history information. Then, the modification history write section 17 transfers the change information into which the new edit history is written to the information processing section 12.

At step S63, the information processing section 12 receives the change information having the distribution history information modified from the modification history write section 17 and transfers the information to the information holding section 11, which then receives the change information having the distribution history information modified and stores it.

Figure 15:
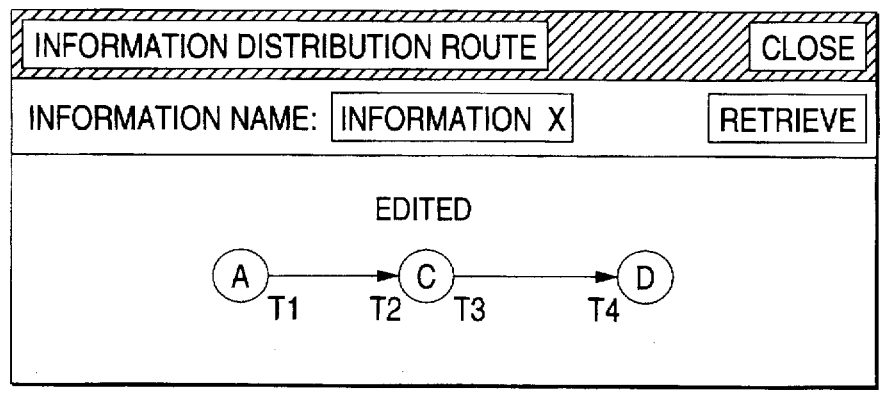
FIG. 15 is an illustration of an example of display produced by a tracing result display section in the second embodiment of the information processing system of the invention.
Figures 16, 17:
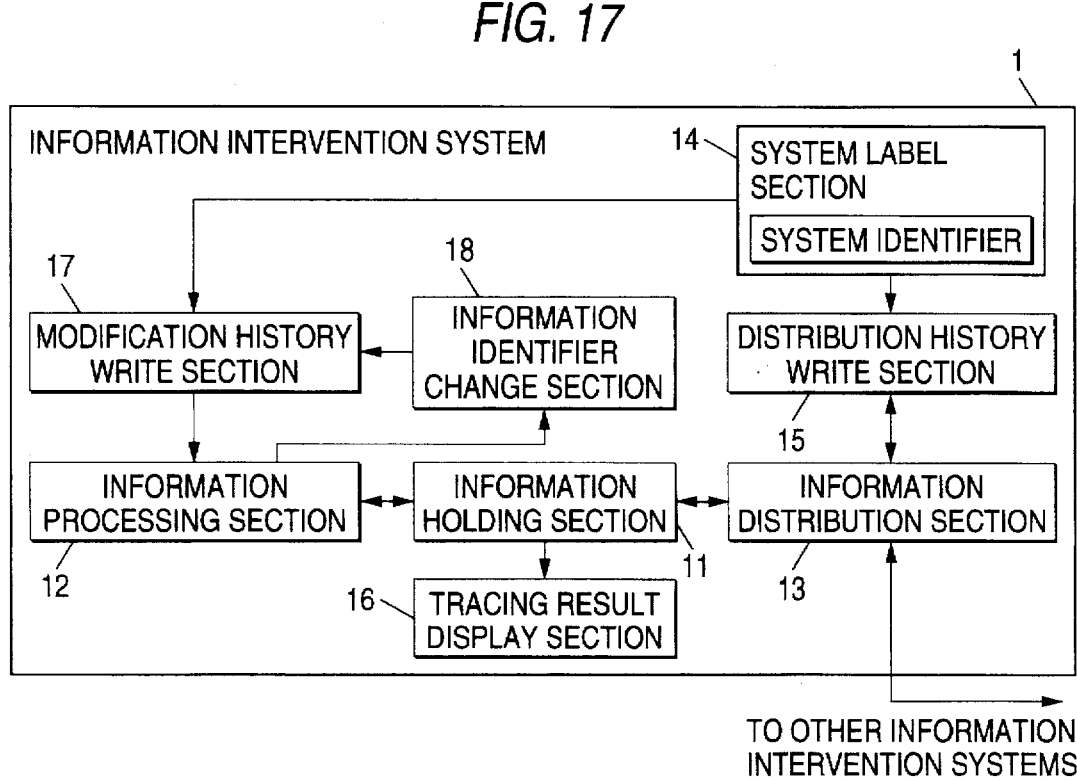
FIG. 16 is an illustration of another example of display produced by the tracing result display section in the second embodiment of the information processing system of the invention.
FIG. 17 is a block diagram to show a third embodiment of the information processing system of the invention.

FIGS. 15 and 16 are illustrations of examples of display produced by the tracing result display section 16 in the second embodiment of the information processing system of the invention. In addition to analyzing of distribution histories and, for example, displaying of distribution routes as in the first embodiment, the tracing result display section 16 can also analyze edit histories, thereby analyzing an information changing process, etc. To display the changing process together with the distribution route, "edited" can be displayed near the node indicating an information intervention system editing the information, for example, as shown in FIG. 15, or an edit history can be displayed in addition to distribution histories in the table format as shown in FIG. 16. Further, only edit histories can also be displayed in the display forms shown in FIGS. 15 and 16. The information processing system can also be configured to enable the user to select one of the display forms containing display of distribution routes only.

In the second embodiment, the fact that the information main body contents were changed is recorded as one type of history information of "edit." However, the invention is not limited to it. For example, the fact that the information main body contents of information received from another information intervention system was changed may be distinguished from the fact that the information main body contents of information not received from another information intervention system. For example, an event in which new information main body contents are prepared in the information intervention system may be called "new preparation" rather than "edit" and an event in which the information main body contents of information received from another information intervention system may be called "addition." In this case, when the modification history write section 17 adds a history to the distribution history information, it needs to determine whether or not history information concerning reception is already written in the distribution history information. If a history related to reception is written in the distribution history information, a history of "addition" may be written; if not, a history of "new preparation" may be written.

In the second embodiment, even when the information main body contents are changed more than once in one information intervention system, only one change history is recorded. However, when the information main body contents are changed more than once in one information intervention system, all may be recorded in the distribution history information.

Further, a clock may be held in the modification history write section 17 for recording the processing end time in an edit history in addition to the history type ("edit") and system identifier. In this case, since only one change history is recorded in the embodiment even when the information main body contents are changed more than once in one system, the end time of the first change processing, the end time of the last change processing, etc., may be used solely or in combination as the time recorded in the history. If a separate change history is recorded each time change processing is performed, the time may be recorded each time.

Third embodiment

Next, a third embodiment of the information processing system of the invention will be discussed. In the second embodiment, information change and distribution histories related are recorded in the distribution history information in information. In the third embodiment, an information identifier for uniquely identifying information is held in an information label section, whereby an information identifier of changed information is also recorded in distribution history information as an information change history, whereby when the user wants to know the former information main body contents after the information contents are changed, he or she can retrieve the former information based on the information identifier recorded in the distribution history information. The information identifier may be a label according to which information can be uniquely identified, or may be a combination of the names of a system and information.

Figure 18:
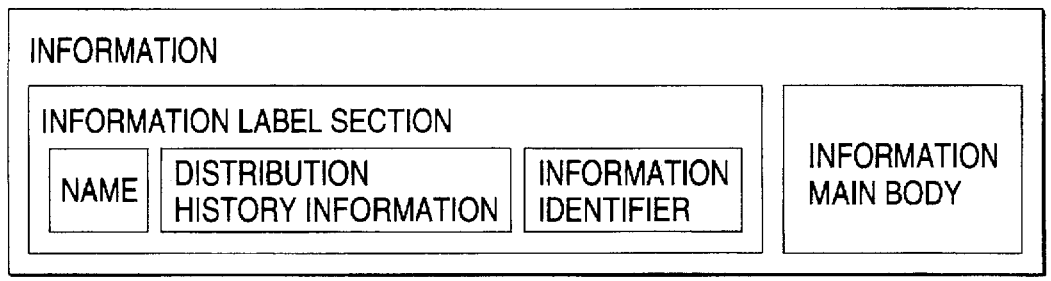
FIG. 18 is an illustration of an example of the format of information in the third embodiment of the information processing system of the invention

FIG. 17 is a block diagram to show the third embodiment of the information processing system of the invention. FIG. 18 is an illustration of an example of the format of information in the third embodiment of the information processing system of the invention. Sections identical with or similar to those previously described with reference to FIGS. 1 and 12 are denoted by the same reference numerals in FIG. 17 and will not be discussed again. In FIG. 17, numeral 18 is an information identifier change section. As shown in FIG. 18, an information identifier is held in an information label section of information in addition to an information name and distribution history information. The information identifier uniquely identifies information held in every information intervention system 1. When an information main body is first prepared or the information main body contents are changed, the information identifier is determined by the information identifier change section 18 of the information intervention system 1. The distribution history information consists of the history type (sending, reception, or edit), the system identifier of the information intervention system performing the operation (sending, reception, or edit), and the time of day at which the operation was performed. However, history information representing a change contains the information identifier of the changed information.

When an information processing section 12 changes the information main body contents, the changed information contents are transferred to the information identifier change section 18. The information processing section 12 receives the information whose distribution history information is changed from a modification history write section 17 and transfers the information to an information holding section 11.

The information identifier change section 18 receives the information whose information main body contents were changed from the information processing section 12. It determines the information identifier given to the information, writes it into the information label section of the information, and deletes the old information identifier, then transfers the information into which the new information identifier is written to the modification history write section 17.

The information identifier can be determined, for example, by concatenating the system identifier and a value for identifying all information to which the information intervention system issues information identifiers, which will be hereinafter referred to as an intrasystem identifier. For example, the information intervention system assigns the intrasystem identifiers in the ascending order from 0 to 1 to 2, ... and stores the maximum one of already assigned values in a counter. Whenever a new information identifier is assigned, the counter value is incremented by one. When the system identifier is A and the intrasystem identifier is 123, the information identifier can be set to A123.

When the information is transferred, the modification history write section 17 adds a set of the new information identifier, the history type indicating the change in the information contents, the identifier of the information changing system, and the time of day to the distribution history information. In the second embodiment, whether or not an edit history in the system exists in the distribution history information in the information label section is determined, but not determined in the third embodiment. Then, the modification history write section 17 transfers the information to the information processing section 12. It holds a clock and the time of day written into the distribution history information is determined by the clock.

When the distribution history information is displayed on a tracing result display section 16, the information identifiers of information can also be displayed.

Figure 19:
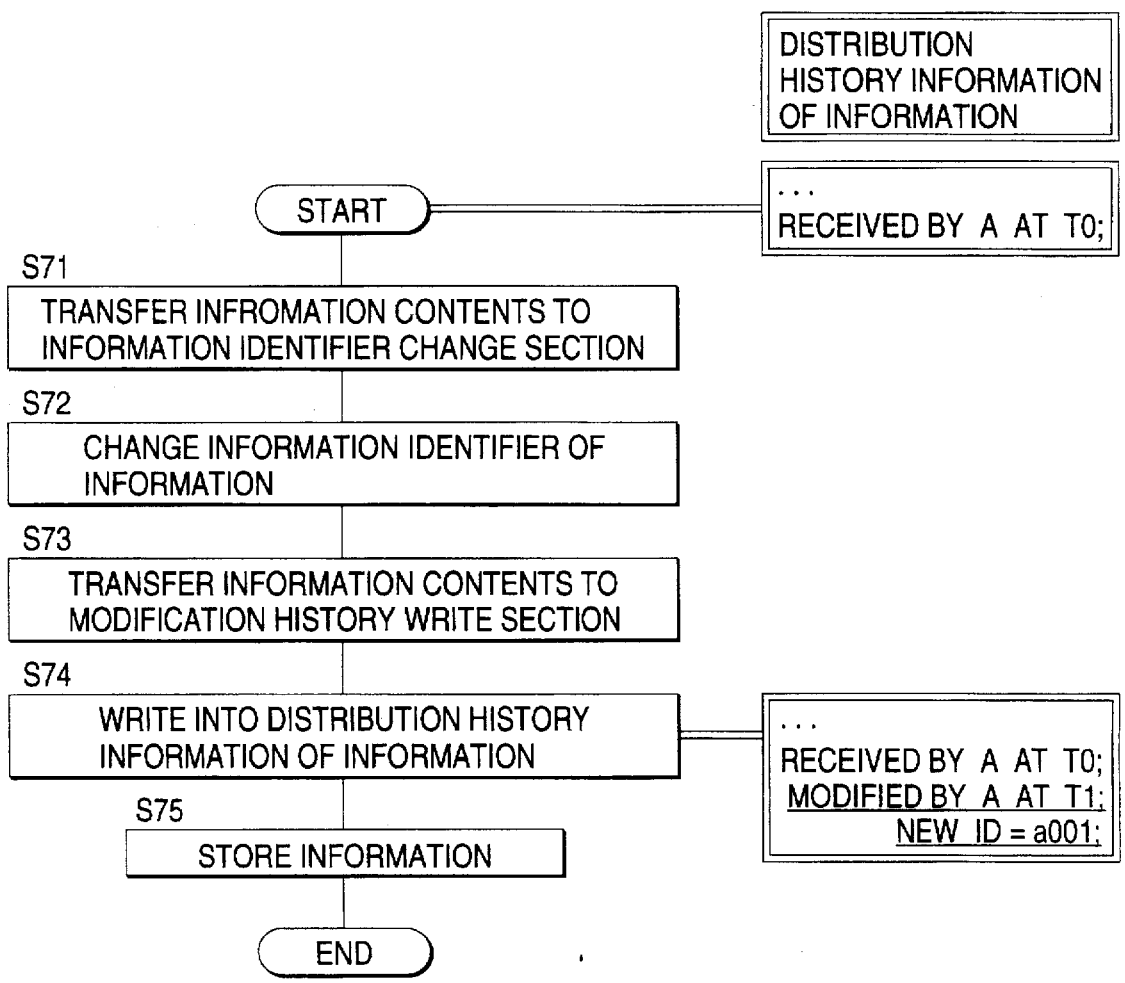
FIG. 19 is a flowchart to show an operation example of holding changed information in the third embodiment of the information processing system of the invention.

Next, an example of the operation in the third embodiment of the information processing system of the invention will be discussed. The operation of information transfer and tracing result display is the same as that in the second embodiment and therefore will not be discussed again. FIG. 19 is a flowchart to show an operation example of holding changed information in the third embodiment of the information processing system of the invention. FIG. 19 shows how the distribution history information contents change in addition to the operation example. In the description of the distribution history information in FIG. 19, the underscore denotes new history information added at the step. Hereinafter, the information whose information main body contents were changed will be called change information.

Assume that in the initial state, the following distribution history received by A at T0;

is recorded at the end of the distribution history information of information. In this state, upon completion of changing the information main body in the information processing section 12, at step S71, the information processing section 12 transfers the changed information main body and information label section to the information identifier change section 18.

At step S72, the information identifier change section 18 receives the changed information main body and information label section, determines a new information identifier, writes the new information identifier into the information label section of the received information, and deletes the old information identifier.

At step S73, the information identifier change section 18 transfers the information main body and information label section to the modification history write section 17.

At step S74, the modification history write section 17 receives the change information from the information identifier change section 18 and reads a system identifier from a system label section 14. It adds history information consisting of the history type indicating the changing, the system identifier, the information identifier, and the time of day to the distribution history information in the information label section of the received change information. In the example shown in FIG. 19, the following edit history is recorded:

modified by A at T1, new ID=a001;

where A is the system identifier, a001 is the information identifier, and T1 is the time of day. The modification history write section 17 transfers the information into which the new history information is written to the information processing section 12.

At step S75, the information processing section 12 receives the change information having the distribution history information modified from the modification history write section 17 and transfers the change information to the information holding section 11, which then receives the change information having the distribution history information modified and stores it.

An example of distribution history information recorded by such processing is given. For example, consider that information whose information identifier is a000 is modified twice in information intervention system A and sent via information intervention system B to information intervention system C, which then adds modification to the received information. In this case, when the information modified in the information intervention system C is stored in the information holding section 11, for example, the following histories are recorded in the distribution history information in the information:

modified by A at T0'; new ID=a0011;
modified by A at T0"; new ID=a007;
sent by A at T1;
received by B at T2;
sent by B at T3;
received by C at T4;
modified by C at T4'; new ID=c001;

where the character string following 'new ID=' at the end of each row containing the word "modified" denotes the information identifier of the information whose contents were changed.

Figures 20, 21:
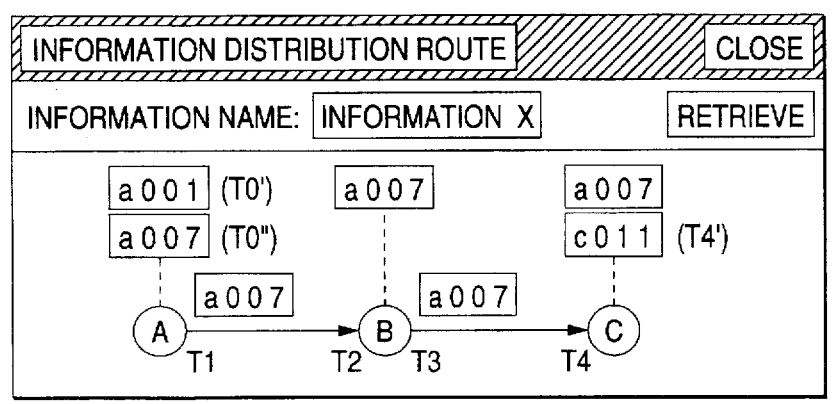
FIG. 20 is an illustration of an example of distribution history information in the third embodiment of the information processing system of the invention.
FIG. 21 is an illustration of an example of display produced by a tracing result display section in the third embodiment of the information processing system of the invention.

FIG. 20 is an illustration of an example of distribution history information in the third embodiment of the information processing system of the invention. The distribution history information can also be represented as described above; in fact, it is recorded as binary data, as shown in FIG. 20. In the third embodiment, a target information identifier field is added as compared with the second embodiment. The information identifiers generated by the information identifier change section 18 are recorded in the field. In FIG. 20, the rows are provided in a one-to-one correspondence with the distribution history information entries. For example, the top row indicates that the information contents were changed in the information intervention system having the system identifier "898345" and that the new information identifier "898345-176" was given. Although the time is not displayed in the edit histories in the example, it may be recorded as described above.

Figures 22, 23:
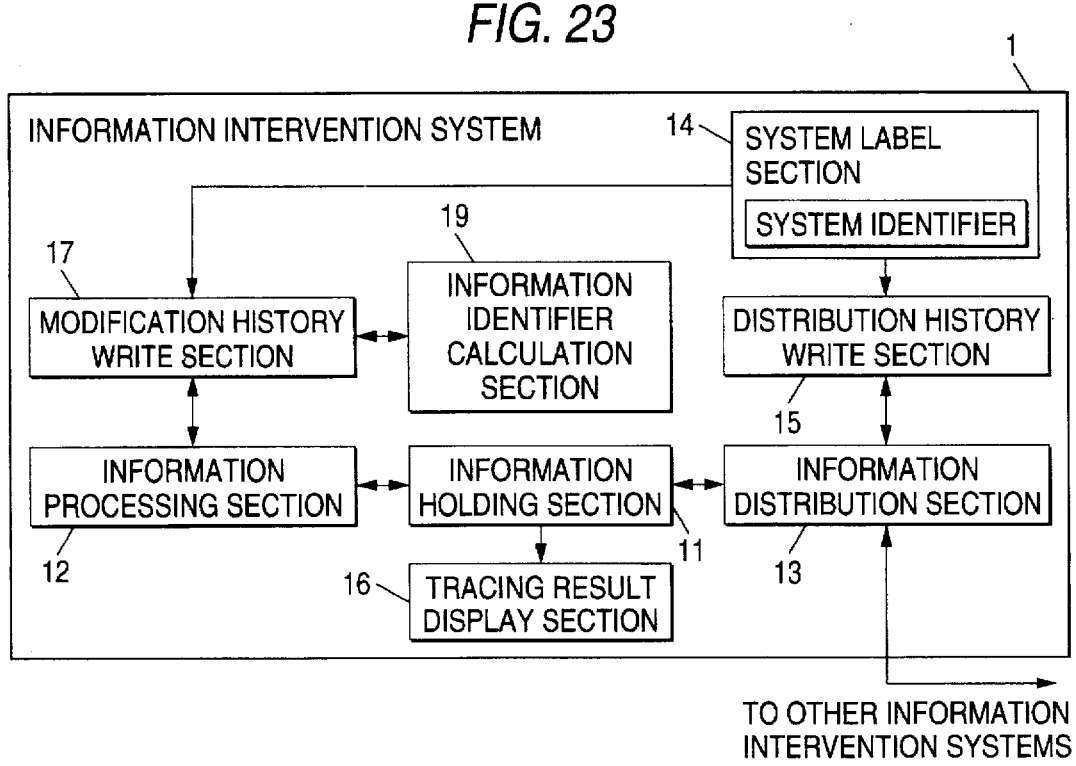
FIG. 22 is an illustration of another example of display produced by the tracing result display section in the third embodiment of the information processing system of the invention.
FIG. 23 is a block diagram to show a fourth embodiment of the information processing system of the invention.

FIGS. 21 and 22 are illustrations of examples of display produced by the tracing result display section in the third embodiment of the information processing system of the invention. The tracing result display section 16 can also display the target information identifiers recorded in the distribution history information of information. In the example shown in FIG. 21, the information identifier of the transferred information is shown above the arrow representing sending and reception, and shown above the circle representing an information intervention system are the information identifier of the information received at the information intervention system and the information identifier of the information whose information main body contents were changed in the information intervention system. For the information whose information main body contents were changed in the information intervention system, the change time of day is shown following the information identifier.

In the example shown in FIG. 22, a new column of "information identifier" is provided for displaying the information identifiers in histories. In sending and reception histories, it can be considered that the information having the same information identifier as in the preceding history was sent or received without generating a new information identifier. Thus, in FIG. 22, "ditto" is displayed under the information identifier column corresponding to the sending and reception histories.

In the third embodiment, when modified information is stored in the information holding section 11, a new information identifier determined by the information identifier change section 18 is recorded in the distribution history information of the information. However, the invention is not limited to it. For example, the old information identifier may be recorded as old ID.

After the information main body is modified, the name in the information label section of the information may be changed for storing the information in the information holding section 11. In this case, as new information is prepared, the distribution history information can be cleared or as information is modified, the distribution history information can be copied and held intact. To copy and hold the distribution history information intact, the name of the information before the modification is recorded in the distribution history information and for example, when display is produced as shown in FIG. 21 or 22, the information name can also be displayed in place of the information identifier.

Fourth embodiment

Next, a fourth embodiment of the information processing system of the invention will be discussed. In the third embodiment, to identify information, information identifiers are given to information by information intervention systems 1 and held in the corresponding information label sections. By the way, in addition to the information identifier holding method, a method using the information main body contents is also available to identify information. In the fourth embodiment, an example using this method will be discussed.

FIG. 23 is a block diagram to show the fourth embodiment of the information processing system of the invention. Sections identical with or similar to those previously described with reference to FIGS. 1, 12, and 17 are denoted by the same reference numerals in FIG. 23 and will not be discussed again. In FIG. 23, numeral 19 is an information identifier calculation section. An information name and distribution history information are held in an information label section of information in the fourth embodiment, as shown in FIG. 2 in the first embodiment.

When an information processing section 12 changes the information main body contents, the changed information contents are transferred to a modification history write section 17, which then receives the information contents, sends the received information contents to the information identifier calculation section 19, and receives a new information identifier of the information therefrom. Then, it adds a set of the new information identifier, the history type indicating the change in the information contents, the information changing system identifier, and the time of day to the distribution history information of the information. Then, the modification history write section 17 transfers the information to the information processing section 12. It holds a clock and the time of day written into the distribution history information is determined by the clock.

The information identifier calculation section 19 holds a unidirectional hash function for calculating an information identifier from the information main body contents. When receiving the information whose information main body contents are changed from the modification history write section 17, the information identifier calculation section 19 uses the hash function based on the information main body contents to generate a new information identifier of the information, and returns the information identifier to the modification history write section 17.

The unidirectional hash function is a function for converting a bit string of any length into a bit string of a certain length, and has a feature of scarcely outputting the same value if different bit strings are input. It is often used with cryptographic theories, and has a feature of outputting different values if data is compressed to a certain length and input data is different. This feature can be used to identify information in the embodiment. For example, according to OKAMOTO Eiji, "Introduction to Cryptographic Theories" Kyouritsu Publication Co., 1993, pp.138–140, an example of a specific has function is described. According to the book, SHA (secure hash algorithm) is a standard proposal of the unidirectional hash function indicated by Standard Bureau of Department of Commerce in America (NIS). The SHA outputs 160 bits as a hash value for a message (information to be transmitted) of any length (less than $2^{64}$ bits). As a hash function example by the SHA, the book describes SHA output of a message consisting of ASCII code of a, b, c 01100001 01100010 01100011 becomes

0164B8A9 14CD2A5E 74C4F7FF 082C4D97 F1EDF880 in 32-bit word units.

The SHA, which is described in detail in the book, comprises the following three steps:

(1) Dividing a message by a certain length;

(2) performing operations of exclusive OR, bit shift, etc., in combination for each message division; and (3) outputting a hash value based on the operation results at step (2) for all message divisions.

Information can be uniquely represented by the information identifier provided by using such a hash function. Thus, information can be identified and its distribution can be analyzed without adding an information identifier to the information.

Figure 24:
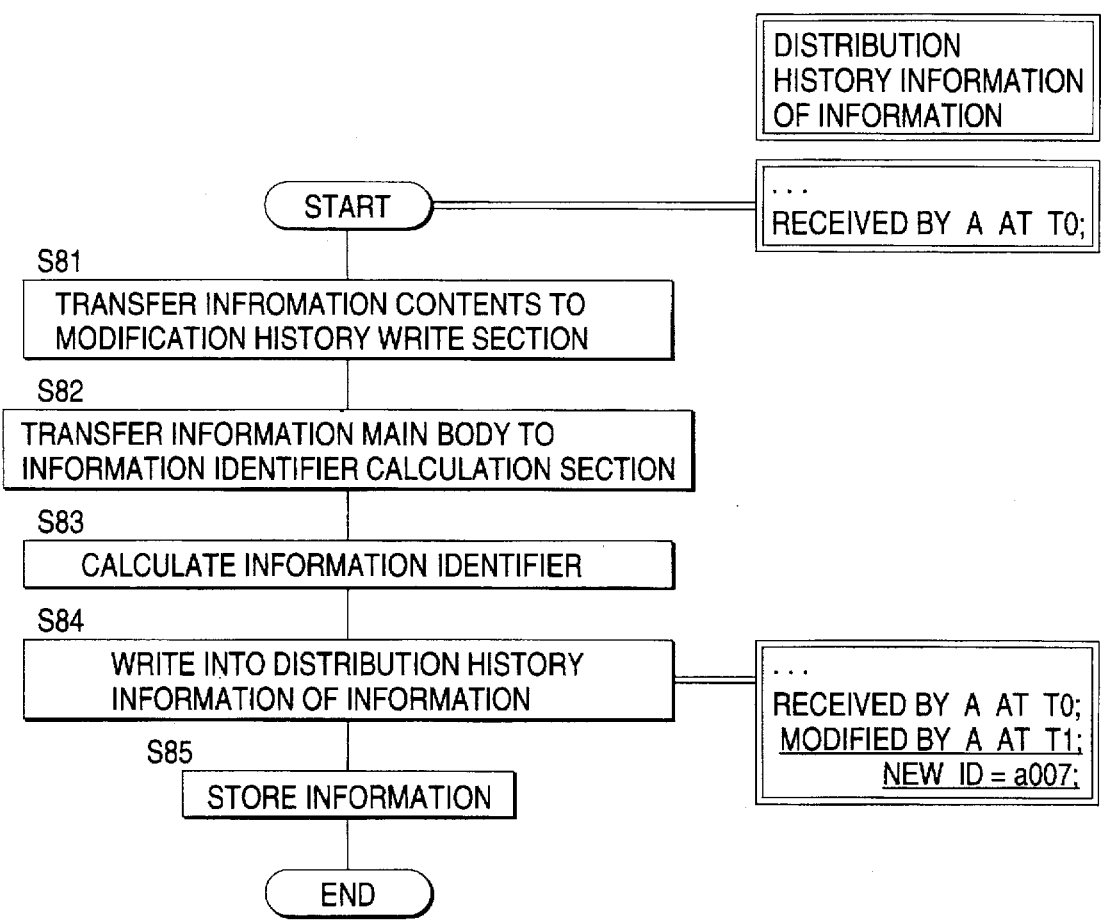
FIG. 24 is a flowchart to show an operation example of holding changed information in the fourth embodiment of the information processing system of the invention.

Next, an example of the operation in the fourth embodiment of the information processing system of the invention will be discussed. The operation of information transfer and tracing result display is the same as that in the second embodiment and therefore will not be discussed again. FIG. 24 is a flowchart to show an operation example of holding changed information in the fourth embodiment of the information processing system of the invention. FIG. 24 shows how the distribution history information contents change in addition to the flowchart to show the operation example. In the description of the distribution history information in FIG. 24, the underscore denotes new history information added at the step. Hereinafter, the information whose information main body contents were changed will be called change information.

Upon completion of changing the information main body in the information processing section 12, at step S81, the information processing section 12 transfers the changed information main body and information label section to the modification history write section 17. At step S82, the modification history write section 17 receives the change information from the information processing section 12 and transfers the changed information main body to the information identifier calculation section 19. At step S83, the information identifier calculation section 19 receives the changed information main body, calculates an information identifier of the information, and transfers the calculated information identifier to the modification history write section 17. At step 84, the modification history write section 17 receives the information identifier from the information identifier calculation section 19 and reads a system identifier from a system label section 14. It adds history information consisting of the history type indicating the changing, the system identifier, the information identifier, and the time of day to the distribution history information in the information label section of the received information. The modification history write section 17 transfers the change information into which the new distribution history information is written to the information processing section 12. At step S85, the information processing section 12 receives the change information having the distribution history information modified from the modification history write section 17 and transfers the change information to an information holding section 11, which then receives the change information having the distribution history information modified and stores it.

In the example shown in FIG. 24, when the reception history received by A at T0;

is recorded at the end of the distribution history information of the information in the initial state, an attempt is made to modify the information main body of the information and store the modified information main body in the information holding section 11. In this case, as shown in FIG. 24, the modified information main body is sent to the information identifier calculation section 19 for calculating a new information identifier. Assuming that the new information identifier is 'a007,' at step S84, as shown on the right thereof, the modification history modified by A at T0, new ID=a007;

is added to the distribution history information of the information.

Fifth embodiment

Next, a fifth embodiment of the information processing system of the invention will be discussed, wherein user identifiers are used in place of system identifiers. In the embodiments we have discussed, the system identifier is held in each information intervention system and an analysis is made based on the system identifier. However, normally a number of users use a workstation and who distributed information cannot be specified in tracing with the system identifier. Then, in the embodiment, a configuration for carrying out an analysis based on user identifiers will be discussed.

Figure 25:
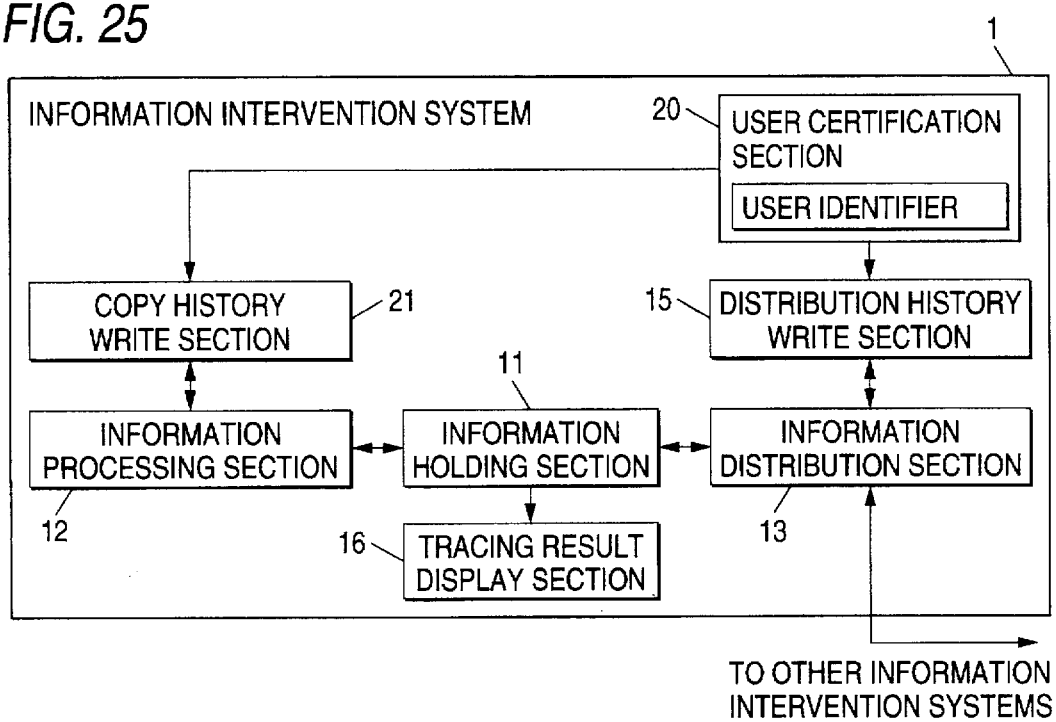
FIG. 25 is a block diagram to show a fifth embodiment of the information processing system of the invention.

FIG. 25 is a block diagram to show the fifth embodiment of the information processing system of the invention. Sections identical with or similar to those previously described with reference to FIG. 1 are denoted by the same reference numerals in FIG. 25 and will not be discussed again. In FIG. 25, numeral 20 is a user certification section and numeral 21 is a copy history write section.

An information intervention system 1 in the fifth embodiment contains the user certification section 20 in place of the system label section 14 having the system identifier in other embodiments. The user certification section 20 certifies the user to be valid in an interactive mode if he or she is valid.

When certification results in success, the user certification section 20 holds the user identifier of the user therein. The user certification method may use a conventional technique with passwords, ID cards, etc., for example. Since more than one user may use one system at the same time, the user certification section 20 holds more than one user identifier. For example, when users U1 and U2 use the same information intervention system 1 at the same time, the user cert ification section 20 holds the user identifiers of both U1 and U2. The user identifiers may be in the sane form as the system identifiers described so far.

In an information processing system 12, one user can transfer his or her held information to another user by copying. The operation of the information processing section 12 at the time varies depending on whether the destination user uses the information intervention system containing the information processing section 12 or another information intervention system.

If the destination user uses the information intervention system containing the information processing section 12, the transferred information is stored in an information holding section 11 of the information intervention system. In this case, the information processing section 12 transfers information on the storage location of the transferred information in the information holding section 11 together with the copied information to the copy history write section 21. Then, it receives the information having the distribution history information changed from the copy history write section 21 and transfers the information to the information holding section 11.

If the destination user uses another information intervention system, the transferred information is distributed via an information distribution section 13 of the information intervention system used by the source user to the information intervention system used by the destination user. In this case, the information processing section 12 transfers the copied information to the information holding section 11 and further instructs the information holding section 11 to transfer the information to the information distribution section 13.

When recording information sending and reception histories in distribution history information, a distribution history write section 15 uses user identifiers instead of system identifiers. When recording an information sending history, the distribution history write section 15 inquires the user identifier of the user starting the information sending process of the user certification section 20 and writes the returned user identifier into the distribution history information. When recording an information reception history, the distribution history write section 15 inquires the user owning the storage location of the information in the information holding section 11 of the information distribution section 13 and writes the user identifier of the user into the distribution history information.

The copy history write section 21 receives information and the storage location thereof from the information processing section 12. It also searches the user certification section 20 for the user identifier of the user starting the information sending process. The copy history write section 21 adds a set of the history type indicating the information sending, the source user identifier, and the time of day to the distribution history information in the information label section of the received information. Subsequently, it adds a set of the history type indicating the information reception, the destination user identifier, and the time of day. Then, it transfers the information to the information processing section 12. The source user identifier can be specified as the user starting the copying process. The destination user identifier can be specified as the user owning the storage location at the destination. The current time of day is determined by a clock held by the copy history write section 21.

Next, an example of the operation in the fifth embodiment of the information processing system of the invention will be discussed. The tracing result display operation is the same as that in the first embodiment and therefore will not be discussed again. When the source and destination users use different information intervention systems, the information transfer operation is the same as that in the first embodiment except that the user identifier rather than the system identifier is recorded in the distribution history information, and therefore will not be discussed again.

Figure 26:
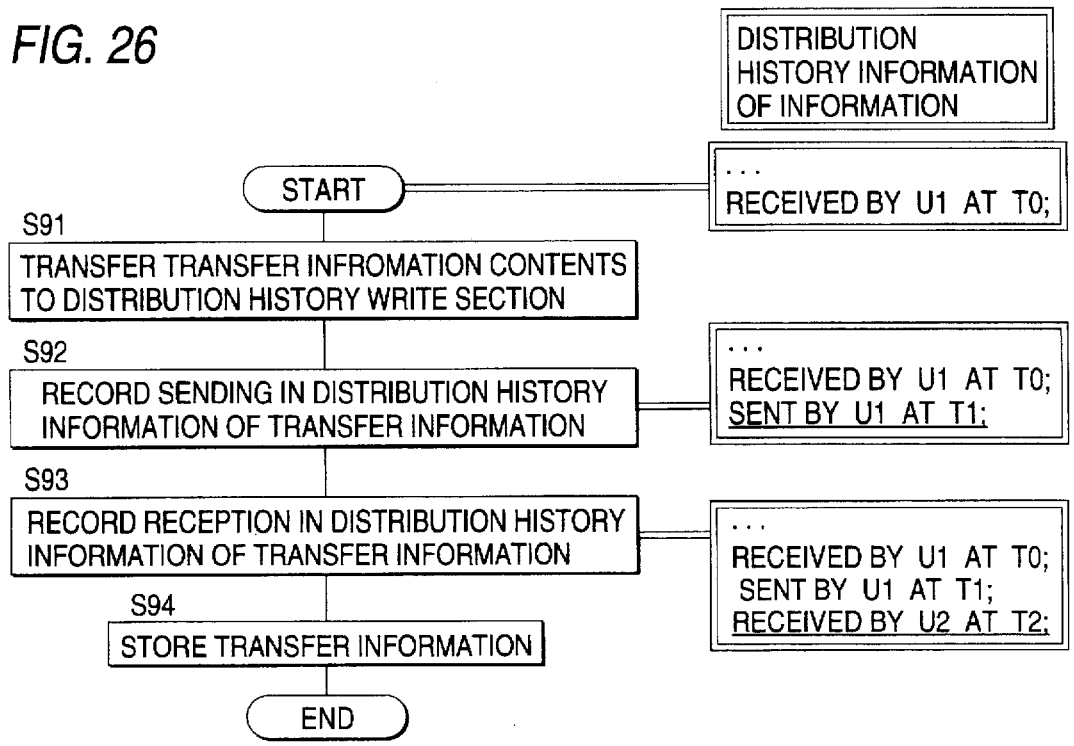
FIG. 26 is a flowchart to show an information transfer operation example when the source and destination users use the same information intervention system in the fifth embodiment of the information processing system of the invention.

FIG. 26 is a flowchart to show an information transfer operation example when the source and destination users use the same information intervention system in the fifth embodiment of the information processing system of the invention. FIG. 26 shows how the distribution history information contents change in addition to the flowchart to show the operation example. In the description of the distribution history information in FIG. 26, the underscore denotes new history information added at the step. Hereinafter, the transferred information will be called transfer information.

At step S91, the information processing section 12 transfers transfer information and information on the storage location of the transfer information in the information holding section 11. At step S92, the copy history write section 21 receives the transfer information and the information on the storage location of the transfer information in the information holding section 11 from the information processing section 12. It also searches the user certification section 20 for the user identifier of the user starting the information transferring process. The copy history write section 21 adds distribution history information consisting of the history type indicating the information sending, the user identifier, and the time of day to the distribution history information in the information label section of the received information. At step S93, it adds distribution history information consisting of the history type indicating the information reception, the user identifier of the user owning the storage location of the transfer information, and the time of day to the distribution history information. Then, it transfers the transfer information into which the new distribution history information is written to the information processing section 12. At step S94, the information processing section 12 receives the transfer information having the distribution history information changed from the copy history write section 21 and transfers the information to the information holding section 11, which then receives the transfer information having the distribution history information changed and stores it.

The distribution history information change example shown in FIG. 26 indicates transfer of information from user U1 to user U2, the users using the same information intervention system. In the initial state, the reception history
   received by U1 at T0;
is recorded at the end of the distribution history information of the information. When the user U1 gives a command for transferring information to the user U2, the copy history write section 21 gets the user identifier U1 from the user certification section 20 and adds the history
   sent by U1 at T1;
to the distribution history information in the information label section of the received information. Further, it gets the destination user identifier U2 and adds the history
   received by U2 at T2;
to the distribution history information. The information sending and reception histories between the users are thus recorded in the distribution history information in the information as in information distribution between the information intervention systems.

Further, if the information is distributed from user U1 via user U2 to user U3, the following sending and reception histories are recorded as the distribution history information in the information:
   sent by U1 at T1;
   received by U2 at T2;
   sent by U2 at T3;
   received by U3 at T4;
   sent by U3 at T5;
where U1, U2, and U3 are the user identifiers of the users sending and receiving the information.

FIG. 27 is an illustration of an example of distribution history information in the fifth embodiment of the information processing system of the invention. The distribution history information may be recorded as character strings as mentioned above or binary data as shown in FIG. 27. One row in the table represents one distribution history. For example, the information on the top row in the table shown in FIG. 27 means that the user having the user identifier "23076" sent the information at 12 hours 9 minutes 4 seconds 41 on Mar. 10, 1995.

FIGS. 28 and 29 are illustrations of display examples of a tracing result display section in the fifth embodiment of the information processing system of the invention. If the distribution history information is recorded with the user identifiers as described above, the tracing result display section 16 displays the user identifiers in place of the system identifiers in the first embodiment. The display example shown in FIG. 28 corresponds to that shown in FIG. 9; it displays the user identifiers in place of the system identifiers in circles. The display example shown in FIG. 29 corresponds to that shown in FIG. 10; it provides a column of the user identifiers in place of the system identifier column. Of course, display may be produced in other display forms.

In the fifth embodiment, the user identifiers rather than the system identifiers are recorded in the distribution history information, but the invention is not limited to it; the system identifiers as well as the user identifiers may be recorded in the distribution history information.

The fifth embodiment may also be modified as the first embodiment. Edit histories can be contained and the information identifiers can be stored or calculated at the changing time in the fifth embodiment like the second to fourth embodiments. Various modifications in the second to fourth embodiments can also be made in the fifth embodiment.

Sixth embodiment

Next, a sixth embodiment of the information processing system of the invention will be discussed. In the sixth embodiment, unlike the embodiments we have discussed, distribution routes of single information are not displayed and the "distribution route totalization result" of an information group in one unit existing in one system is displayed, whereby the user can know what route the information group existing in the system at some point in time is mainly passed through.

The sixth embodiment enables the user to understand what distribution route the information in his or her possession has been passed through, at a glance from the totalization result displayed in visual form. Therefore, the user can know what route the information in his or her possession has been passed through, how much time it required, where the information distribution was delayed, etc. If information distribution is delayed more than necessary at one point or the distribution amount with one point is extremely large, the user can take some measures against it, or the distribution route of only a specific kind of information, such as communication documents, is examined, whereby the relationship between the information kind and the distribution route can also be examined.

Figure 30:
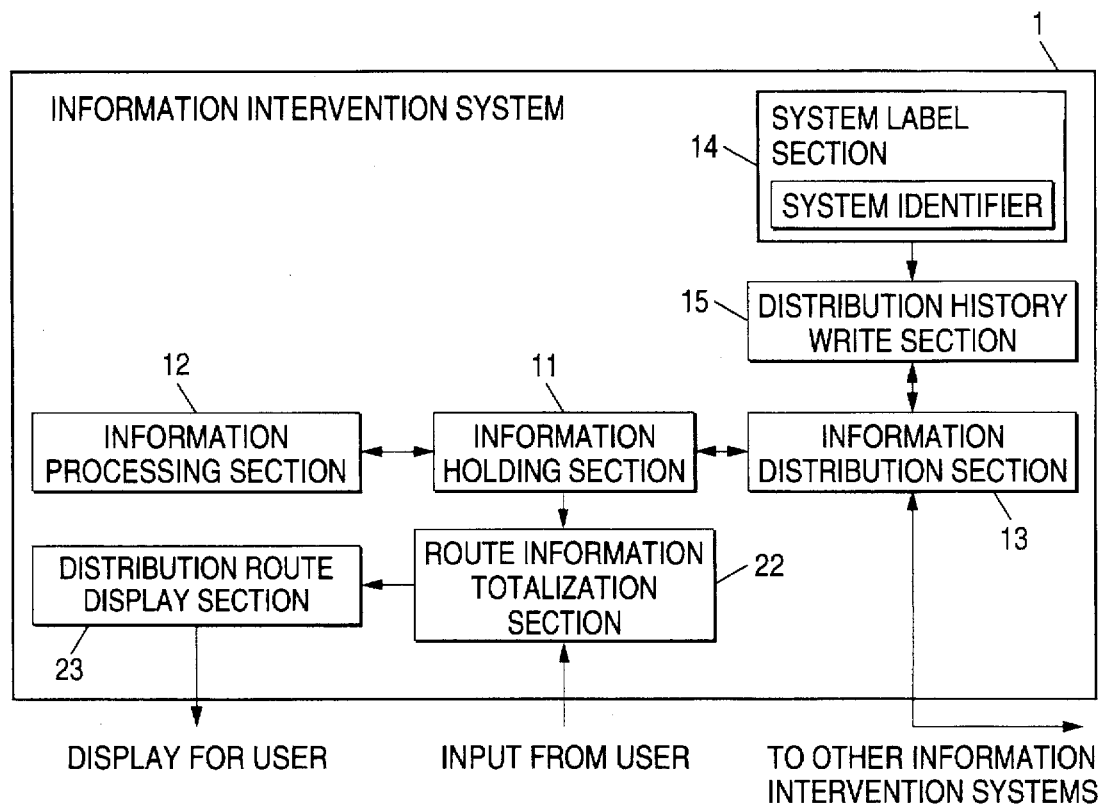
FIG. 30 is a block diagram to show a sixth embodiment of the information processing system of the invention.

FIG. 30 is a block diagram to show the sixth embodiment of the information processing system of the invention. Sections identical with or similar to those previously described with reference to FIG. 1 are denoted by the same reference numerals in FIG. 30 and will not be discussed again. In FIG. 30, numeral 22 is a route information totalization section and numeral 23 is a distribution route display section. The sixth embodiment differs from the first embodiment in that the route information totalization section 22 and the distribution route display section 23 are added in place of the tracing result display section 16 in the first embodiment.

The route information totalization section 22 has a role of gathering distribution histories of a number of information items stored in an information holding section 11 and totalizing them. The user gives a totalization start command. At the time, the user can also specify the totalized information range. The distribution route display section 23 processes the totalization result of the route information totalization section 22 to visual form for the user.

Figure 31:
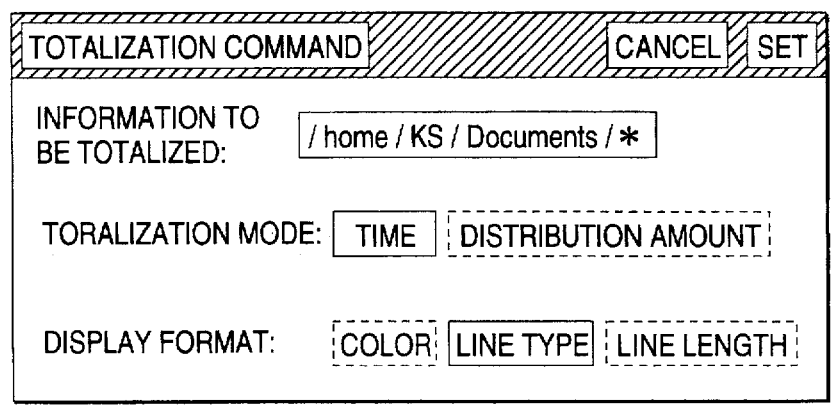
FIG. 31 is an illustration of an example of user specification for a route information totalization section in the sixth embodiment of the information processing system of the invention.

FIG. 31 is an illustration of an example of user specification for the route information totalization section in the sixth embodiment of the information processing system of the invention. In the example shown in FIG. 31, the user can specify the three options of information to be totalized, totalization mode, and display format.

The information to be totalized is specified in the INFORMATION TO BE TOTALIZED field. In the example, the entry in the field means that all files under the directory "home/KS/Documents" are to be totalized. In addition to such specification of all information under one directory, specification of all files having file names ending with ".TXT" (description of *.TXT), all files whose kind is "electronic mail," etc., can also be made. Such a file retrieval function can be easily provided, for example, by a "find" command in the Unix operating system.

Which item of history information held in distribution histories attention is focused on for totalization is specified in the TOTALIZATION MODE field. For example, totalization of the average time required for distribution from one system to another or the total distribution amount between systems is selectively specified. The example shown in FIG. 31 indicates that TIME meaning the former or DISTRIBUTION AMOUNT meaning the latter can be specified and that TIME is selected.

The display form for displaying the totalization result of the distribution information totalization section 22 in the specified totalization mode is specified in the DISPLAY FORMAT field. In the example shown in FIG. 31, the display format can be selected from among the three items of COLOR, LINE TYPE, and LINE LENGTH, and LINE TYPE is selected.

Figure 32:
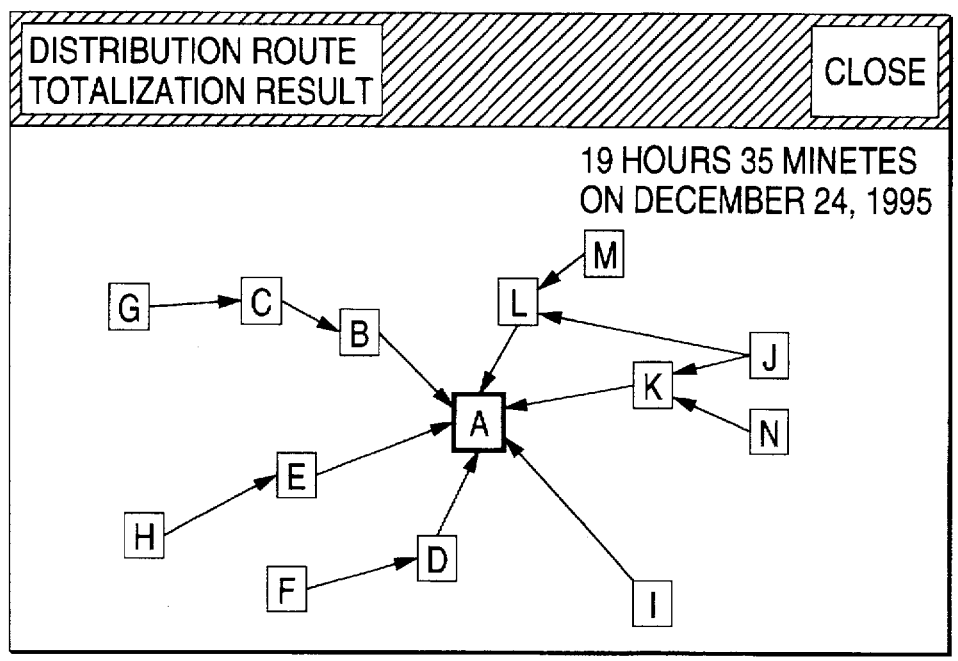
FIG. 32 is an illustration of an example of display produced by a distribution route display section in the sixth embodiment of the information processing system of the invention.
Figure 33:
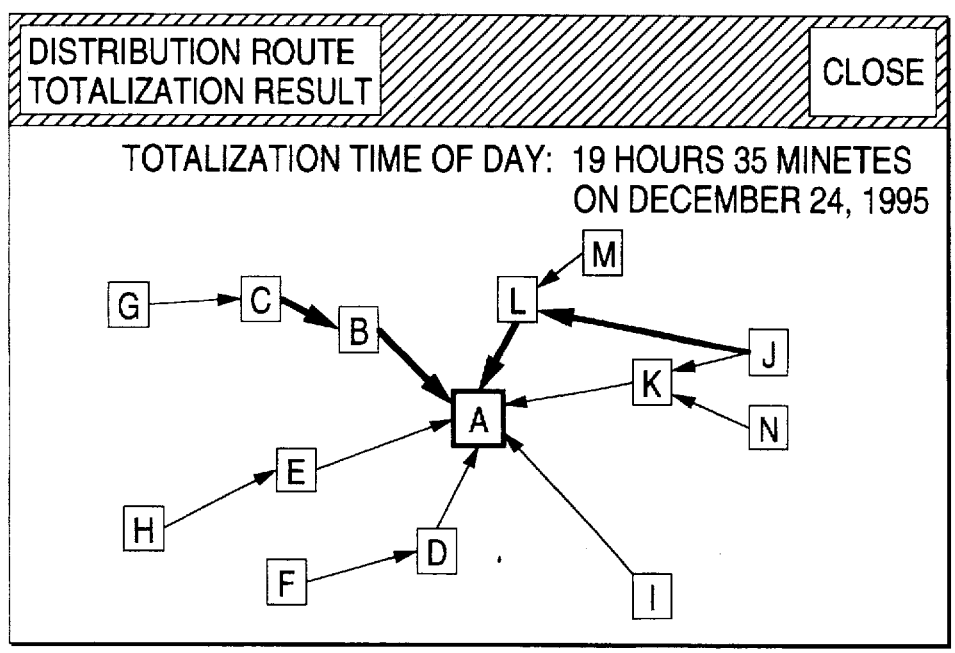
FIG. 33 is an illustration of another example of display produced by the distribution route display section in the sixth embodiment of the information processing system of the invention.
Figure 34:
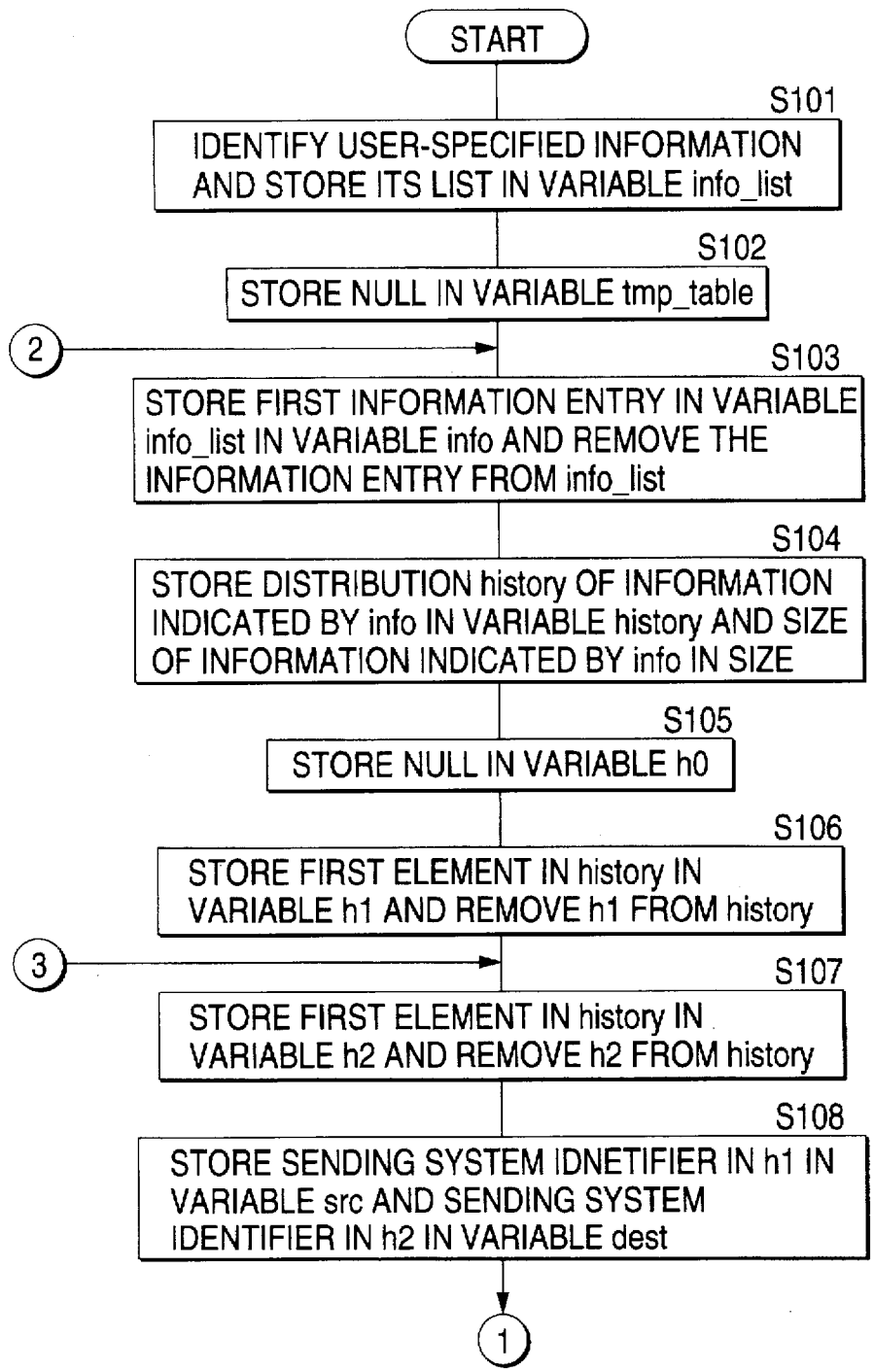
FIG. 34 is a flowchart to show an example of the operation of the route information totalization section in the sixth embodiment of the information processing system of the invention.
Figure 35:
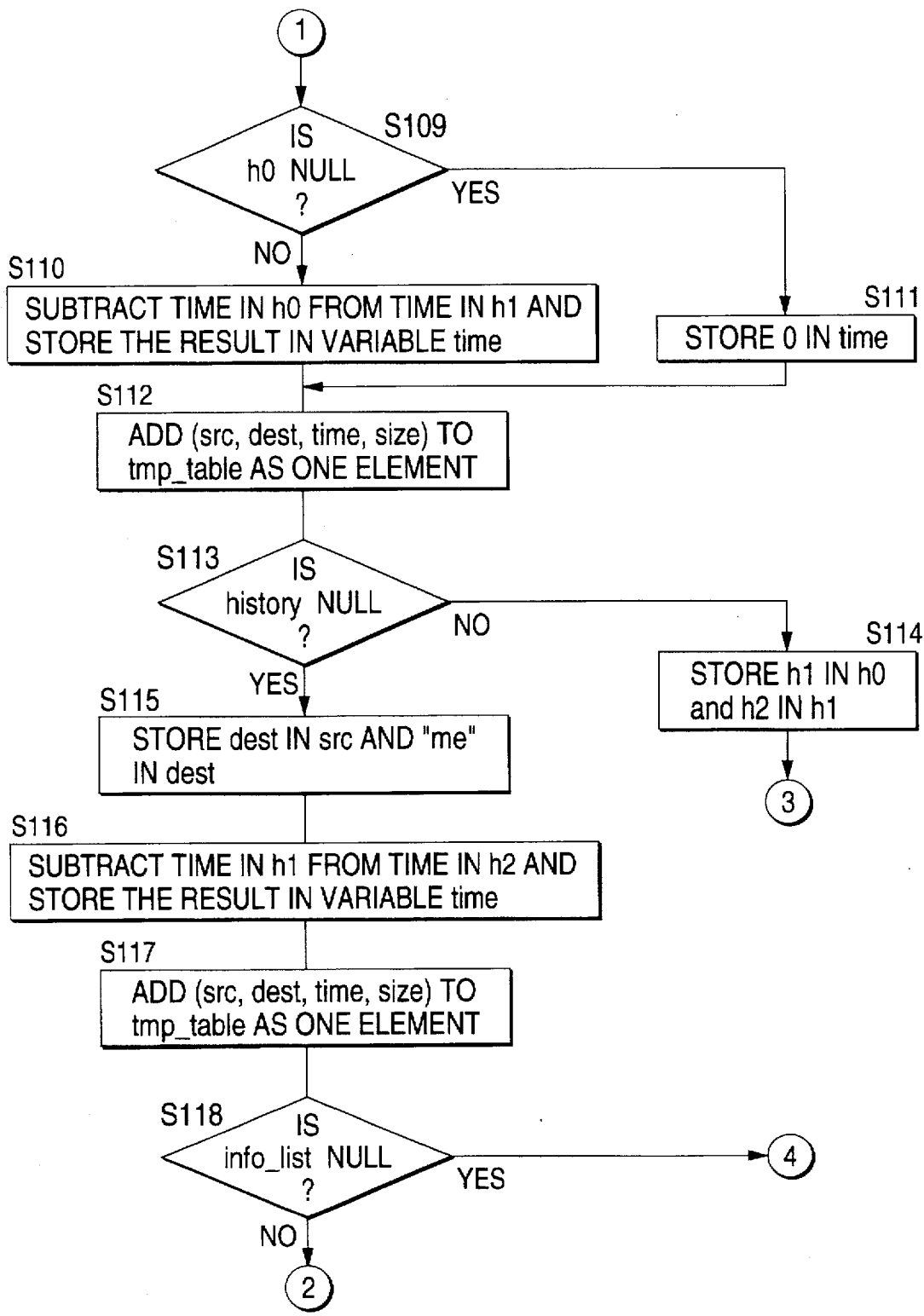
FIG. 35 is a flowchart (continued) to show an example of the operation of the route information totalization section in the sixth embodiment of the information processing system of the invention.
Figure 36:
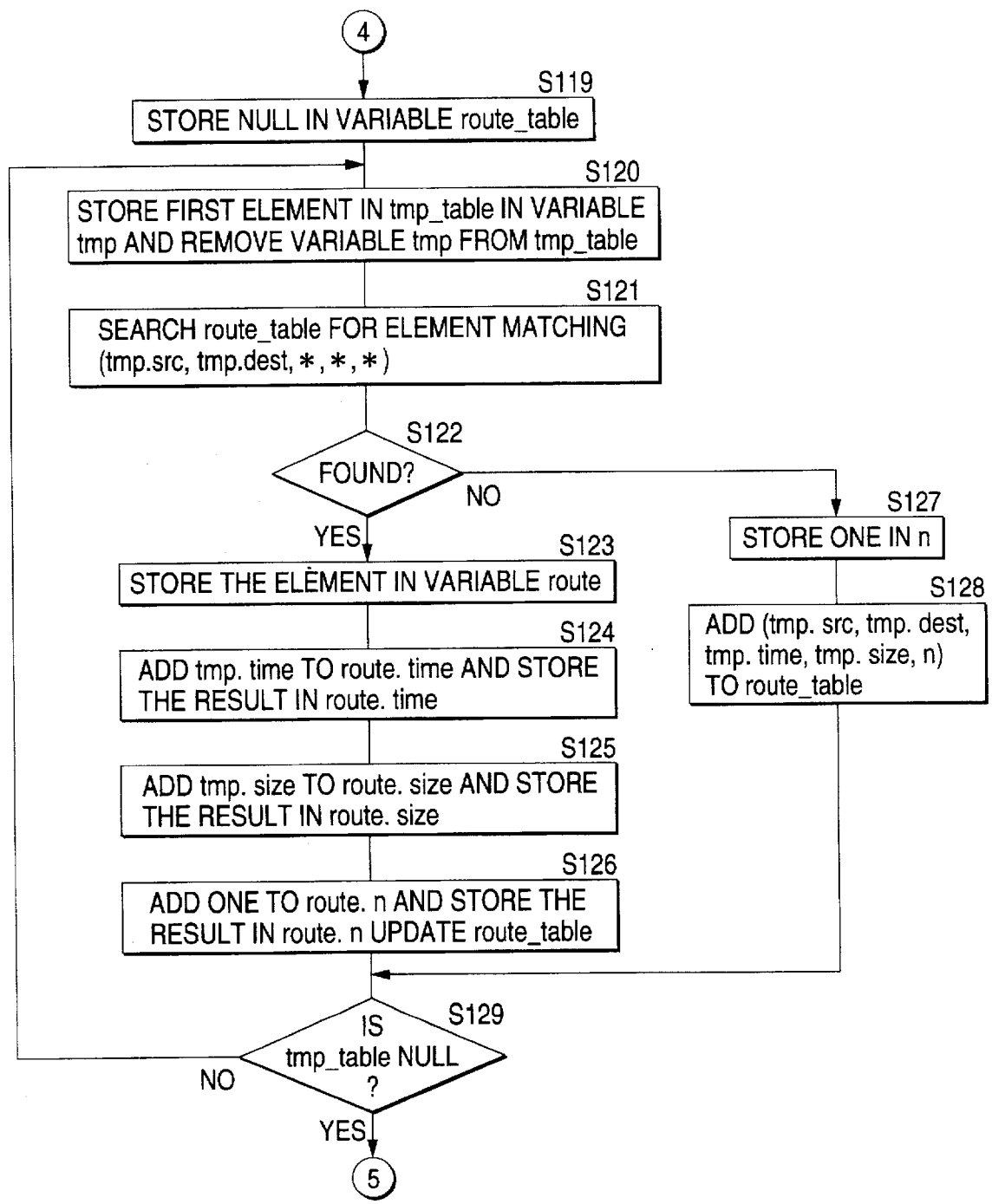
FIG. 36 is a flowchart (continued) to show an example of the operation of the route information totalization section in the sixth embodiment of the information processing system of the invention.
Figure 37:
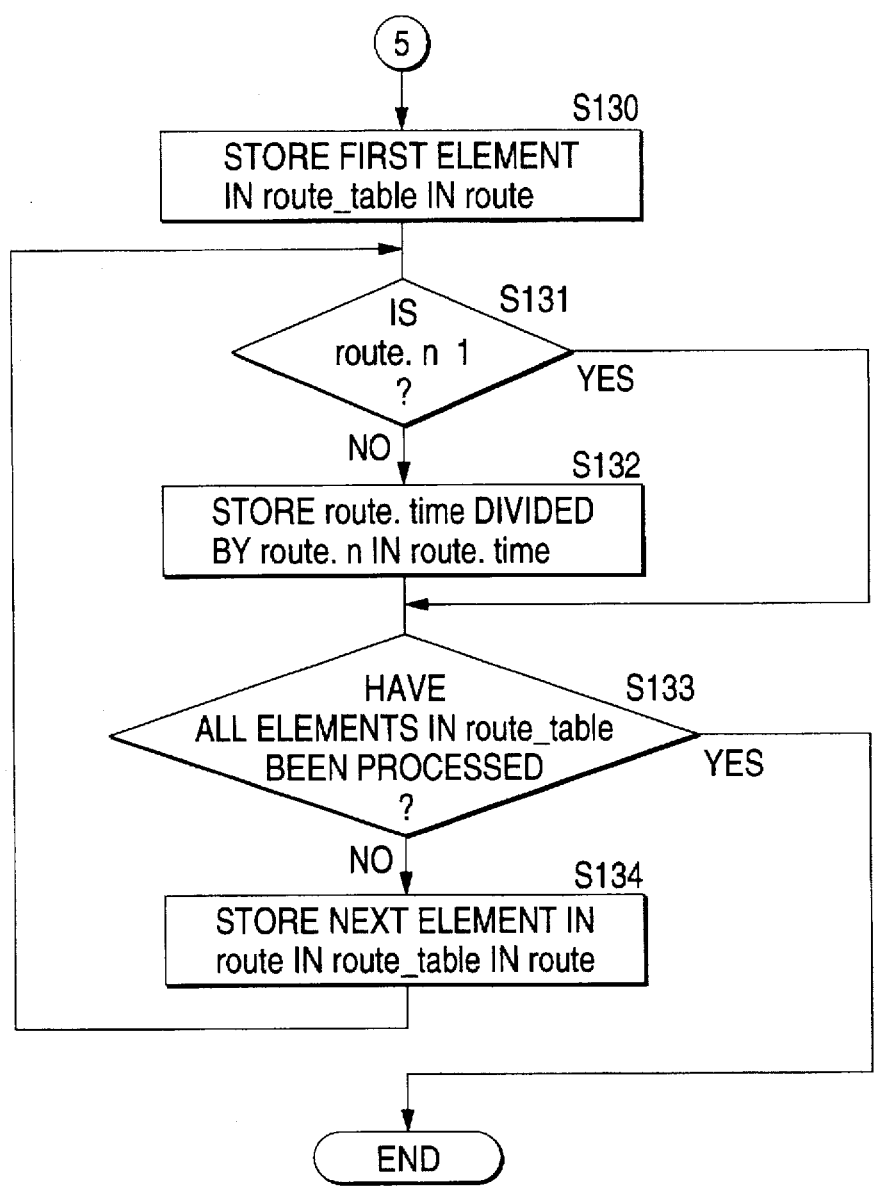
FIG. 37 is a flowchart (continued) to show an example of the operation of the route information totalization section in the sixth embodiment of the information processing system of the invention.

FIGS. 32 and 33 are illustrations of examples of display produced by the distribution route display section in the sixth embodiment of the information processing system of the invention. As shown in FIG. 32, the distribution route totalization result is represented finally by a directed graph with nodes representing systems and arcs representing the distribution relationships. In FIG. 32, the rectangles indicated by alphabetic characters denote the systems (system identifiers) and the arrows connecting them denote the distribution relationships. In the example, the home system is the system A highlighted at the center. It is indicated by the heavy frame for convenience of the illustration. For example, the user can see distribution routes of information from system H through system E to home system A and from system N through system K to home system A.

When the distribution route totalization result is displayed, the arc portions of the directed graph are changed in the display format specified in the DISPLAY FORMAT field shown in FIG. 31 in response to the totalization mode specified in the TOTALIZATION MODE field. For example, if the totalization mode is the distribution amount and the display format is the color, the color is changed according to the distribution amount in such a manner that the arc with a large distribution amount between systems is displayed in a red family color and that the arc with a small distribution amount between systems is displayed in a blue family color. If the totalization mode is the time and the display format is the line length, the line length is changed according to the distribution time in such a manner that the arc with long time taken is lengthened and that the arc with short time taken is shortened. The display example shown in FIG. 33 indicates that the line type is selected as the display format; the arc with long distribution time taken or a small distribution amount is indicated by a thin line and the arc with short distribution time taken or a large distribution amount is indicated by a heavy line. A broken line, dotted line, etc., may be used for the arc with longer time taken or a smaller distribution amount.

FIGS. 34 to 37 are flowcharts to show an example of the operation of the route information totalization section in the sixth embodiment of the information processing system of the invention. At step S101, user-specified information is identified and its list is stored in variable info_list. The information is specified in the INFORMATION TO BE TOTALIZED field in FIG. 31, for example. At step S102, NULL is stored in variable tmp_table as initialization. The variable tmp_table is an intermediate description table for temporarily holding pairs of the information sending and receiving systems from distribution histories.

Steps S103–S118 are executed for each information entry specified. First, at steps S103–S112, two successive distribution histories are assumed to be a history pair and are converted into the description "sending: A, reception: B, required time: T1-T0, size: S" where A is the system identifier in the preceding distribution history in the pair, B is the system identifier in the following distribution history in the pair, T1 is the sending time of day in the preceding distribution history in the pair, T0 is the sending time of day in the distribution history preceding the preceding distribution history in the pair, and S is the size of the information main body of the information with the distribution histories held, for example, represented in bytes. If there is no distribution history preceding the preceding distribution history, 0 is assigned to the required time, which means that the required time for information distribution from system X to system y is assumed to be the time interval between the time of day at which the system X received the information from its preceding system and the time of day at which the system X sent it to the system Y.

At step S103, the first information entry in the variable info_list is stored in variable info and is removed from the variable info_list. At step S104, the distribution history of the information indicated by the variable info is fetched and stored in variable history. Also, the size of the information indicated by the variable info is stored in variable size.

Steps S107–S114 are executed for each distribution history of the information indicated by the variable info. As initialization for the steps, NULL is stored in variable h0 at step S105 and the first element (distribution history) is fetched from among the distribution histories stored in the variable history and is stored in variable h1, and is also removed from the variable history at step S106.

At step S107, the top element is fetched from among the distribution histories stored in the variable history and is stored in variable h2, and is also removed from the variable history. At step S108, the sending system identifier in the distribution history stored in the variable h1 is stored in variable src and the sending system identifier in the distribution history stored in the variable h2 is stored in variable dest. At this time, the information intervention system having the sending system identifier stored in the variable src is the sending system and the information intervention system having the sending system identifier stored in the variable dest is the receiving system.

At step S109, whether or not the variable h0 is NULL is determined. If it is not NULL, at step S110, the sending time recorded in the distribution history stored in the variable h0 is subtracted from the sending time in the distribution history stored in the variable h1 and the result is stored in variable time, whereby the time required by the time the sending system distributed the information is stored in the variable time. If the variable h0 is NULL, namely, the information is first distributed, 0 is stored in the variable time at step S111.

At step S112, a set of the sending system identifier stored in the variable src, the sending system identifier stored in the variable dest, the value of the variable time, and the value of the variable size is added to the variable tmp_table as one element. That is, a set of the system identifiers of the information sending and receiving systems, the time required by the time the information was distributed, and the size of the distributed information is stored in the variable tmp_table.

At step S113, whether or not the variable history is null, namely, all distribution histories for one information entry have been processed is determined. If an unprocessed distribution history is left, at step S114, the contents of the variable h1 are moved to the variable h0 and the contents of the variable h2 are moved to the variable h1, then control returns to step S107.

If the variable history is null, further the description "sending: B, reception: Home system, required time: T2-T1, size: S" is added, where T1 is the sending time of day in the system immediately preceding B and T2 is the sending time of day in B. At step S115, the contents of the variable dest are moved to the variable src and "me" indicating the home system is stored newly in the variable dest for setting the home system to the receiving system. Here, the home system identifier is represented as "me" to explicitly indicate the home system, but the actual system identifier may be used.

At step S116, the sending time recorded in the distribution history stored in the variable h1 is subtracted from the sending time in the distribution history stored in the variable h2 and the result is stored in variable time. At step S117, a set of the system identifier of the system sending the information directly to the home system, the system identifier of the home system, the time required by the time the information was distributed, and the information amount is added to the variable tmp_table.

At step S118, whether or not the variable info_list is null, namely, all information entries specified by the user have been processed is determined. If an unprocessed information entry exists, control returns to step S103 for processing the information. Upon completion of all information entries, sets of the system identifiers of the information sending and receiving systems, the time required by the time the information was distributed, and the information amount are stored in the variable tmp_table.

At step S119 and later, the time required by the time the information was distributed in each system and the distributed information amount between the systems are totalized based on the sets stored in the variable tmp_table. To do this, variable route_table, which is a route information table, is searched for the same pair as each of the information sending and receiving system identifier pairs stored in the variable tmp_table. If the same pair is not found, the number of histories is set to 1 and other data pieces are registered intact. If the same pair is found, one is added to the number of histories and the required time and the size value of the process data are added to the entries of the required time and the size value in the route information table.

First, at step S119, the variable route_table for storing totalization information among the systems is initialized to NULL. at step S120, the first element in the variable tmp_table is stored in variable tmp and is removed from the variable tmp_table. At step S121, the variable route_table is searched for the element matching (tmp.src, tmp.dest, *, *, *), where tmp.src and tmp.dest denote fields in the variable tmp, indicating the sending system identifier and the receiving system identifier among the sending system identifier, the receiving system identifier, the time required by the time the information was distributed, and the distributed information amount stored in the variable tmp, and * denotes a wild card matching any data.

At step S122, whether or not the search at step S121 results in success is determined. If the element matching (tmp.src, tmp.dest, *, *, *) exists in the variable route_table, at step S123, the element is fetched and stored in variable route. At step S124, the value of tmp.time is added to route.time in the variable route to obtain a new route.time value. At step S125, the value of tmp.size is added to route.size to obtain a new route.size value. Further, at step S126, one is added to route.n to obtain a new route.n value. The variable route thus changed is used to update the variable route_table.

On the other hand, if the search at step S121 does not result in success, at step S127, one is stored in n and at step S128, a new set of (tmp.src, tmp.dest, tmp.time, tmp.size, n) is prepared and added to the variable route_table as one element.

At step S129, whether or not the variable tmp_table is null is determined. If it is not null and an unprocessed element is left, control returns to step S120 for processing the remaining element. When the variable tmp_table becomes null, the total time required by the time the information was distributed, the total distributed information amount, and the number of times distribution has been executed are stored in the variable route_table for all pairs of the sending and receiving systems.

At steps S130–S134, an average of the required time is taken for each data item in the variable route_table, a route information table. That is, the required time is divided by the number of histories and the result is stored in the required time.

At step S130, the first element in the variable route_table is fetched and stored in the variable route. At step S131, whether or not the value of route.n in the variable route is 1 is determined. If it is not 1, at step S132, the value of the total time route.time required by the time the information was distributed is divided by the number of times distribution has been executed, route.n, to find average time required by the time the information was distributed, and the found average time is stored as a new value of route.time. At step S133, whether or not such an average value finding process has been executed for all elements in the variable route_table is determined. If an unprocessed element is left, at step S134, the next element in the variable route is fetched from the variable route_table and is stored in the variable route, and control returns to step S131 for continuing the process.

Upon completion of processing for all elements in the variable route_table, the processing in the route information totalization section 22 is terminated. At the termination of the processing, a set of (sending system identifier, receiving system identifier, average time required for distribution, total distributed information amount, and the number of times distribution has been executed) is stored in the variable route_table as one element of route information. The route information totalization section 22 outputs it as the totalization result.

Next, a processing example of the route information totalization section 22 shown in FIGS. 34–37 will be discussed with a specific example. The route information totalization section 22 totalizes the distribution history information written into the information label sections of information. FIG. 38 is an illustration of an example of distribution history information in the sixth embodiment of the information processing system of the invention. The distribution history information is held in the format, for example, as shown in FIG. 38. FIG. 38 (A)–(C) shows distribution histories given to information X, information Y, and information Z respectively. This format is basically similar to that in the distribution history example in the first embodiment shown in FIG. 3; only information sending histories are provided. In the example shown in FIG. 38, the distribution history information is recorded as binary data. For example, the second row in FIG. 38 (A) means that information A "was sent by the system having the system identifier 800287 at 22 hours 23 minutes 34 seconds 89 on Mar. 13, 1995. The system identifiers are represented in digits in the example, but may be shown in characters of 'A,' 'B,' 'C,' etc., as shown in FIGS. 32 and 33 or represented in character strings such as dog, cat, and frog, or the distribution histories may be held as text information like sent by A at T1;
sent by B at T2;
sent by C at T3;

as described above. In this case, if T1<T2<T3, it means that the information flows from A to B to C to home system and exists in the home system at present. In the example, when information is sent, a distribution history is given to the information, thus the information existing in the home system does not contain a sending history related to sending the information from the home system.

At step S101, the user-specified information group is identified. Here, assume that the user enters the commands as shown in FIG. 31, that the identified information group contains information X, information Y, and information Z, and that the distribution histories shown in FIG. 38 are given to the information X, information Y, and information Z.

For example, if data of the information X indicated by the variable info is fetched from the variable info_list at step S103, the distribution histories on the three rows shown in FIG. 38 (A) are stored in the variable history and the data size of the information X (5167 bytes) is stored in the variable size at step S104. The first distribution history in FIG. 38 (A) is stored in the variable h1 at step S106 and the distribution history on the second row in FIG. 38 (A) is stored in the variable h2 at step S107. Further, the sending system identifier 898345 is stored in the variable src from the variable hi at step S108 and the sending system identifier 800287 is stored in the variable dest from the variable h2 at step S109.

Since the variable h0 is NULL at the beginning, the variable time is set to 0 at step S111 and (sending: 898345, receiving: 800287, required time: 0, size: 5167) is added to the variable tmp_table at step S112.

Then, the contents of the variable h1 are moved to the variable h0 and the contents of the variable h2 are moved to the variable h1 at step S114. The distribution history on the third row in FIG. 38 (A) is stored in the variable h2 at step S107. The system identifier 800287 is stored in the variable src at step S108 and the system identifier 850198 is stored in the variable dest at step S109. Now, since the variable h0 is not NULL, the time of day in the variable h0, namely, the time on the first row in FIG. 38 (A), 1995031012090441, is subtracted from the time of day in the variable h1, namely, the time on the second row in FIG. 38 (A), 1995031322233489, and the result 00000000310143048 is stored in the variable time at step S111. That is, required time=1995031322233489, which means 22 hours 23 minutes 34 seconds 89 on Mar. 13, 1995,— 1995031012090441, which means 12 hours 9 minutes 4 seconds 41 on Mar. 10, 1995,=0000000310143048 (three days 10 hours 14 minutes 30 seconds 48) This time is stored in the variable time. (Sending: 800287, receiving: 850198, required time: 0000000310143048, size: 5167) is added to the variable tmp_table at step S112.

Then, since the variable history becomes null, the system identifier 850198, which is the value of the variable dest, is stored in the variable src and "me" indicating the home system is stored in the variable dest at step S115. The time of day in the variable hl, namely, the time on the second row in FIG. 38 (A), 1995031322233489, is subtracted from the time of day in the variable h2, namely, the time on the third row in FIG. 38 (A), 1995031417500809, and the result 0000000019263320 is stored in the variable time at step S116. (Sending: 850198, receiving: me, required time: 00000000019263320, size: 5167) is added to the variable tmp_table at step S117.

FIG. 39 is an illustration of an example of intermediate description converted from distribution history information in the sixth embodiment of the information processing system of the invention. The distribution histories of the information X shown in FIG. 38 (A) are converted into intermediate description as shown on the three top rows in FIG. 39, as described above. Likewise, the distribution histories of the information Y shown in FIG. 38 (B) are converted into intermediate description as shown on the fourth to sixth rows in FIG. 39 and the distribution histories of the information Z shown in FIG. 38 (C) are converted into intermediate description as shown on the two bottom rows in FIG. 39. When control goes to step S119, the intermediate description shown in FIG. 39 is stored in the variable tmp_table.

Steps S119 and later are executed. As the first element in the variable tmp_table, the intermediate description on the first row in FIG. 39 is fetched and stored in the variable tmp at step S120. The variable route_table is searched for the element matching (898345, 800287, *, *, *) from the sending system identifier 898345 and the receiving system identifier 800287 in the variable tmp at step S121. At this point in time, since the variable route_table is NULL, the matching element is not found. Then, the number of histories, the number of times distribution has been executed, n, is set to 1 at step S127 and (sending: 898345, receiving: 800287, required time: 0, size: 5167, number of histories: 1) is added to the variable route_table at step S128.

Since the sending and receiving system identifier pair does not exist in the variable route_table for the intermediate description on the first to fifth rows in FIG. 39, new sets are added to the variable route_table at step S128. In the intermediate description on the sixth row in FIG. 39, the pair of the sending system identifier 850198 and the receiving system identifier me is already registered in the intermediate description processing on the third row in FIG. 39. Thus, it is found in the search at step S121 and control goes to step S123. The found data is stored in the variable route at step S123, the required time is updated at step S124, the size is updated at step S125, and the number of histories is updated at step S126. The data stored in the variable route_table according to the intermediate description on the third row in FIG. 39 is (sending: 850198, receiving: me, required time: 0000000019263320, size: 5167, number of histories: 1), which is stored in the variable route.

At step S124, the required time in the data and the required time on the sixth row in FIG. 39 are added together. That is, 0000000019263320 (19 hours 26 minutes 33 seconds 20)+0000000218035983 (two days 18 hours 3 minutes 59 seconds 83)=0000000313303303 (three days 13 hours 30 minutes 33 seconds 3).

At step S125, the sum of the information X size, 5167 bytes, and the information Y size, 2098 bytes, is found (5167+2098=7265). Further, at step S126, the number of histories is incremented by one, resulting in two. Then, the variable route_table is updated according to the new route information (sending: 850198, receiving: me, required time: 0000000313303303, size: 7265, number of histories: 2).

For the intermediate description on the seventh row in FIG. 39, the pair of the sending system identifier 898345 and the receiving system identifier 800287 is also registered in the variable route_table in the intermediate description processing on the first row in FIG. 39, thus the required time, the size, and the number of histories are updated, as described above. In this case, since the required time is 0, the addition value remains 0. The size is 5167+10987=16154 and the number of histories becomes two. For the intermediate description on the eighth row in FIG. 39, the sending and receiving system identifier pair does not exist in the variable route_table, thus new route information is registered at step S128.

Steps S120–S129 are thus executed for each intermediate description shown in FIG. 39, whereby route information is stored in the variable route_table. At steps S130 and later, for route information with the number of histories two or more, the required time is divided by the number of histories at step S132. In the example, the route information with the pair of the sending system identifier 898345 and the receiving system identifier 800287 and the route information with the pair of the sending system identifier 850198 and the receiving system identifier me contain the number of histories two. Thus, the required time in the route information is divided by two. The required time in the route information with the pair of the sending system identifier 898345 and the receiving system identifier 800287 is 0, thus remains 0 after division. The required time in the route information with the pair of the sending system identifier 850198 and the receiving system identifier me is 0000000313303303 three days 13 hours 30 minutes 33 seconds 3) as described above, thus is divided by two, resulting in 0000000118451651 (one day 18 hours 45 minutes 16 seconds 51).

FIG. 40 is an illustration of an example of a route information table output from the route information totalization section in the sixth embodiment of the information processing system of the invention. As a result of processing as described above, a route information table as shown in FIG. 40 is stored in the variable route_table. The route information totalization section 22 outputs such a route information table as the totalization result.

Next, a processing flow of the distribution route display section 23 will be discussed. The distribution route display section 23 has a function of illustrating the totalization result of the route information totalization section 22, such as the data in the route information table as shown in FIG. 40, in a format for human beings to easily understand as shown in FIG. 32 or 33.

Figure 41:
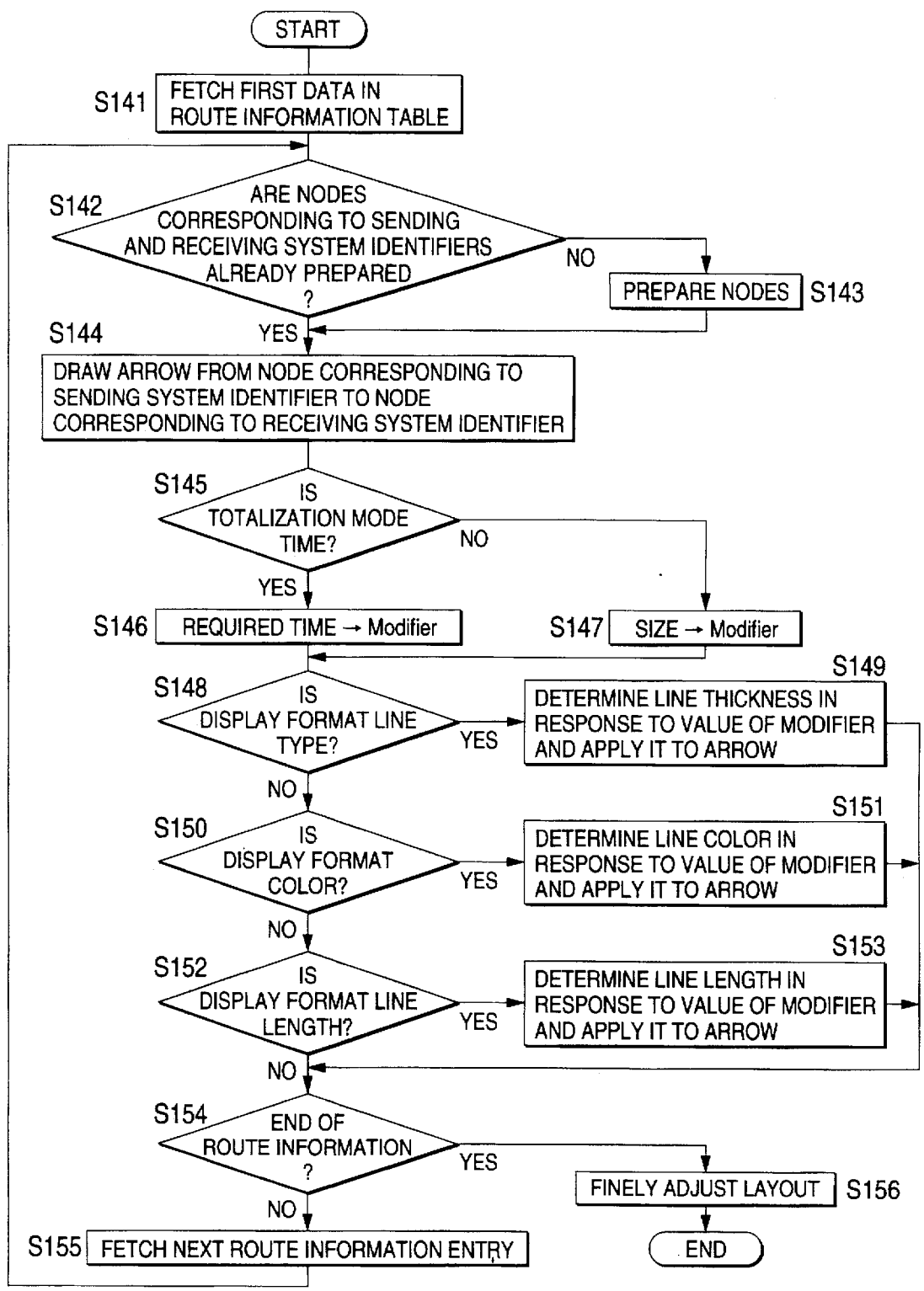
FIGS. 41 is a flowchart to show an example of the operation of the distribution route display section in the sixth embodiment of the information processing system of the invention.

FIGS. 41 is a flowchart to show an example of the operation of the distribution route display section in the sixth embodiment of the information processing system of the invention. The basic processing procedure of the distribution route display section is a technique already established as a directed graph display method, which is only used. Here, a processing flow will be simply described.

At step S141, the first data in the route information table passed from the route information totalization section 22 is fetched. At step S142, whether or not nodes corresponding to the sending and receiving system identifiers in the fetched route information are already prepared is checked. If they do not exist, at step S143, the nodes are prepared. At step S144, an arrow is drawn from the node corresponding to the receiving system identifier to the node corresponding to the sending system identifier.

At step S145, whether the totalization mode specified by the user is TIME or DISTRIBUTION AMOUNT is determined. If it is TIME, at step S146, the required time is stored in variable modifier; if it is DISTRIBUTION AMOUNT, at step S147, the size is stored in variable modifier.

If the display format specified by the user is LINE TYPE at step S148, at step S149, the line thickness is determined in response to the value of the variable modifier and is applied to the arrow drawn at step S144. At step S150, if the display format specified by the user is COLOR, at step S151, the line color is determined in response to the value of the variable modifier and is applied to the arrow drawn at step S144. At step S152, if the display format specified by the user is LINE LENGTH, at step S153, the line length is determined in response to the value of the variable modifier and is applied to the arrow drawn at step S144. When the length is changed, if the node must be moved, the layout is finely adjusted.

Whether or not processing has been executed for all data in the route information table is determined at step S154. If unprocessed data is left, it is fetched at step S155 and control returns to step S142 for repeating the process. When all data in the route information table has been processed, at step S156, the layout is finely adjusted so as not to overlap the nodes or lines, and the display processing is terminated.

Figure 42:
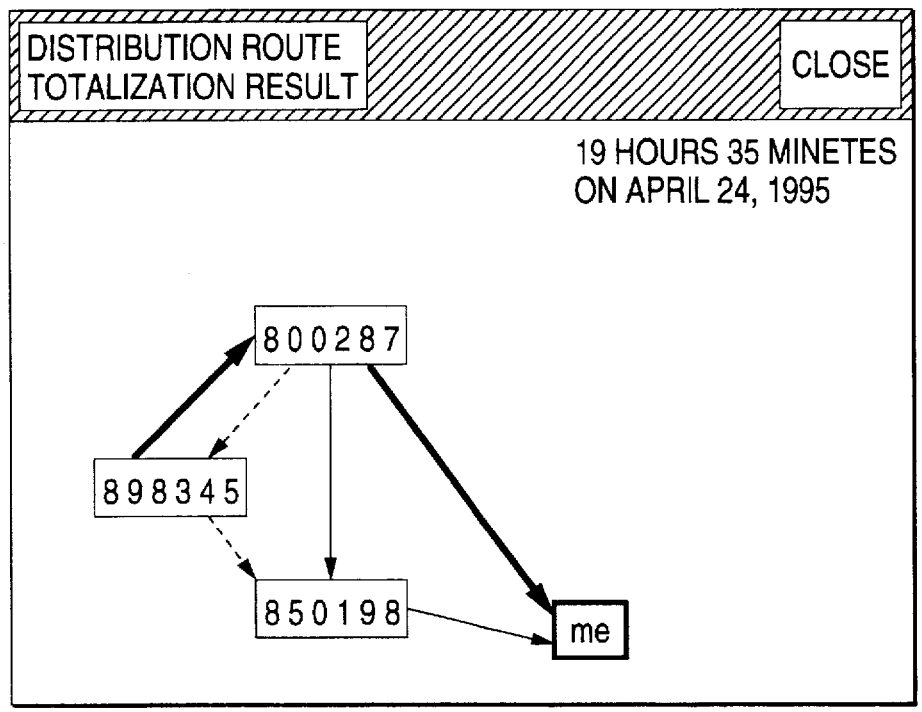
FIG. 42 is an illustration of an example of display of the route information shown in FIG. 40, produced by the distribution route display section in the sixth embodiment of the information processing system of the invention.

FIG. 42 is an illustration of an example of display of the route information shown in FIG. 40, produced by the distribution route display section in the sixth embodiment of the information processing system of the invention. In the example shown in FIG. 42, the user selects DISTRIBU- TION AMOUNT as the totalization mode and LINE TYPE as the display format. In this case, the line type of arc is changed based on the size data in the route information table shown in FIG. 40.

For example, the size of the information distributed from the system having the system identifier 800287 to the home system is 10987 bytes according to FIG. 40 and is large from judging the whole information amount, thus the arc from the system identifier 800287 to "me" is displayed in a heavy line. Since the distributed information amount from the system having the system identifier 800287 to the system having the system identifier 898345 is small as 2098 bytes, the arc from the system identifier 800287 to the system identifier 898345 is indicated by a thin broken line. Seeing such display, the user can know the fact such that the distribution amount between the system having the system identifier 800287 and the home system is large.

Figure 43:
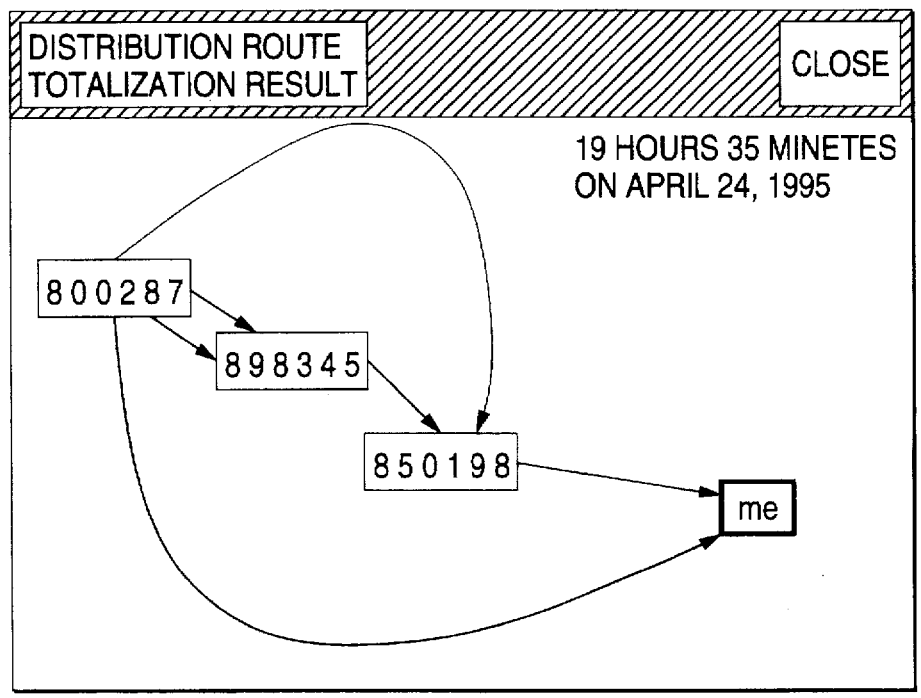
FIG. 43 is an illustration of another example of display of the route information shown in FIG. 40, produced by the distribution route display section in the sixth embodiment of the information processing system of the invention.

FIG. 43 is an illustration of another example of display of the route information shown in FIG. 40, produced by the distribution route display section in the sixth embodiment of the information processing system of the invention. In the example shown in FIG. 43, the user selects TIME as the totalization mode and LINE LENGTH as the display format. In this case, the arc length is changed based on the required time data in the route information table shown in FIG. 40.

For example, since the required time between the system having the system identifier 800287 and the system having the system identifier 898345 is 0 in FIG. 40, the arcs displayed therebetween are short, as shown in FIG. 43. In contrast, since the required time for the information distribution from the system identifier 800287 to the home system is long as four days 20 hours 55 minutes 36 seconds 89 as compared with any other required time, the arc from the system identifier 800287 to me is also long.

Thus, the information distribution delay degree between systems indicating how long one information stays in one system before it is sent to another system can be represented by the line length. For example, the longer the line, the longer the time required for the information distribution between the systems. In this case, the "time" does not refer to the time taken for physical information transmission and refers to the time taken between one system receiving one information and the system distributing the information to another system. Therefore, it means how much time was taken by the time the main user of the system sent the received information to another system since receiving the information. Such information represented by the line length is useful for the user to know, for example, where document circulation which must pass through a specific route in an organization is delayed or which route the information passes faster through when the same information passes through two routes.

Figures 44, 45:
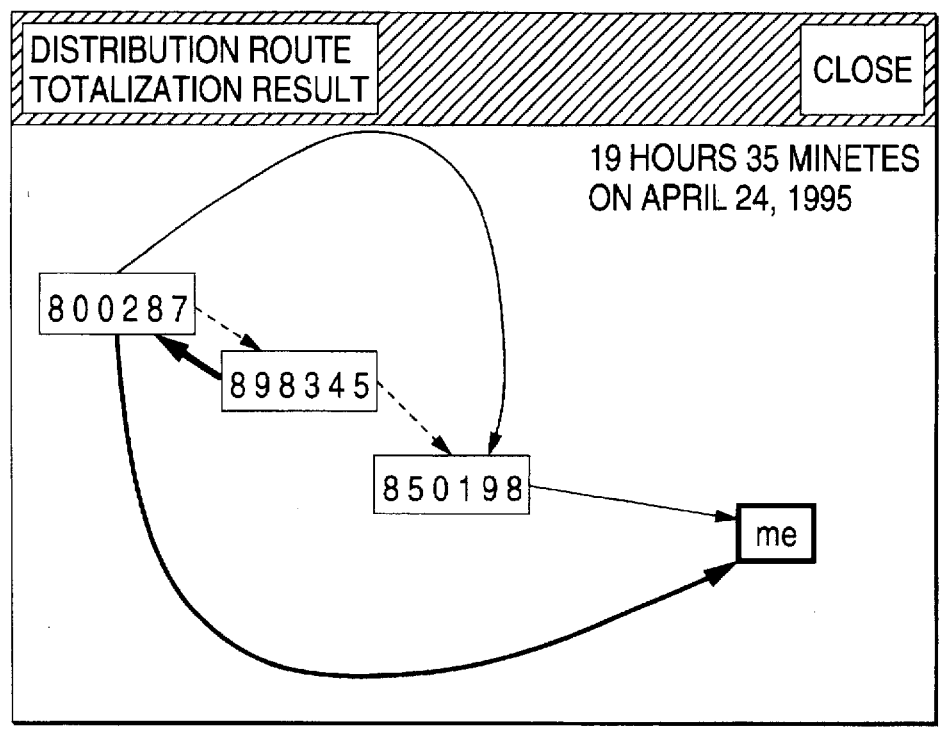
FIG. 44 is an illustration of a still another example of display of the route information shown in FIG. 40, produced by the distribution route display section in the sixth embodiment of the information processing system of the invention.
FIG. 45 is an illustration of an example of user specification for the route information totalization section to display different kinds of information in the sixth embodiment of the information processing system of the invention.

FIG. 44 is an illustration of still another example of display of the route information shown in FIG. 40, produced by the distribution route display section in the sixth embodiment of the information processing system of the invention. In the preceding examples, the time and the distribution amount are not displayed at the same time, but can be displayed together by using different display formats. For example, the distribution amount is represented by changing the line type and the time is represented by changing the line length as shown in FIG. 44, whereby different kinds of information can be displayed at the same time. FIG. 44 provides display representing both the information displayed in FIG. 42 and the information displayed in FIG. 43. Of course, color may be used as either display format. Thus, a different display mode is selected for each of different kinds of information, whereby different kinds of information can be displayed at the same time.

To thus display different kinds of information at the same time, it is necessary to change the user interface through which the user enters a totalization command. FIG. 45 is an illustration of an example of user specification for the route information totalization section to display different kinds of information in the sixth embodiment of the information processing system of the invention. In the example shown in FIG. 45, the display format can be selected for each totalization mode. At the time, to avoid user confusion, preferably processing is performed so that the user is prevented from selecting the same display format in different totalization modes. To display only one kind of information, only either TIME or DISTRIBUTION AMOUNT may be selected for the totalization mode. At this time, preferably the user is prevented from selecting the display format for the unselected totalization mode.

Although distribution histories only at the sending time are used in the description of the sixth embodiment, of course, distribution histories only at the reception time may be used or both may be used. To use the distribution histories only at the sending time, the time of day at which the receiving system received information is assumed to be the same as the time of day at which the sending system sent the information, thus the time required physically for the information transmission between the systems is ignored. A similar comment applies to the case where the distribution histories only at the reception time are used. However, if distribution histories at both the sending time and the reception time are used, the time required physically for the information transmission between the systems can be determined, so that an error caused by the physical transmission time can be eliminated. Totalization according to the transmission time can also be executed.

For the distribution route display method, how information was transmitted is represented by qualifying the arcs in the sixth embodiment, but any other method, such as node qualification, may be used. For example, a node with a particularly large distribution amount to and from the home system may be displayed in red. A user interface may be added to enable the user to change the display range in an interactive mode at the display time in such a manner that nodes or arcs with a certain distribution amount or less are not displayed, whereby the features are displayed more outstandingly.

The sixth embodiment may also be modified as the first embodiment. Edit histories can be contained and the information identifiers can be stored or calculated at the changing time in the fifth embodiment like the second to fourth embodiments. Various modifications in the second to fourth embodiments can also be made in the fifth embodiment. Further, instead of the system identifiers used in the sixth embodiment, for example, the user identifiers can also be recorded in the distribution history information as shown in the fifth embodiment for totalization according to the user identifiers.

In the embodiments, the analysis result is only displayed; how the result is used is arbitrary. The analysis result may be used to automatically send additional information to persons who received one information. To make the system thus perform processing other than display, the tracing result display section 16 or the distribution route display section 23 may be changed to a component for performing necessary processing.

In the embodiments, the information distribution section 13 distributes information and also senses information distribution from a source to a destination to record a distribution history, but the invention is not limited to it. Any component other than the information distribution section 13 may sense information distribution. For example, another process may monitor the information distribution section 13 distributing information. Like information distribution sensing, any component other than the information processing section 12 may sense edit.

The embodiments are applied to information exchange when the systems are connected by networks. In addition, information exchange disconnected from a network, for example, information distribution via information media disconnected from a network such as floppy disk may often be executed. Also in this case, the embodiments we have discussed can be almost applied; however, limitations are placed on the following two of the modifications of the distribution history contents described in the first embodiment.

The first one is the system for writing the identifiers of information sending and receiving systems before information is sent. To distribute information via information media disconnected from networks, when the information is written onto a medium, the information receiving party is unknown. Therefore, the modification is improper.

The second is the system for writing the identifiers of information sending and receiving systems after information is received. To distribute information via information media disconnected from networks, normally the transferred information is written onto a medium, but information concerning the information sending party, such as an information sending system, is not written. Therefore, when the information written on the medium is received, the information receiving party cannot know the information sending party. Thus, the modification cannot be provided without change.

To provide the system, when the transferred information is written onto a medium, information concerning the information sending party needs to be recorded in either the medium or the transferred information. (However, if it is recorded in the transferred information, the modification becomes the same as the first embodiment and cannot be said to be a modification of the first embodiment.)

As seen from the description made so far, the invention enables the user to easily know information distribution routes, etc., later. Tracing in a wider range is enabled by recording not only distribution histories, but also information edit histories. The invention can be applied to distribution of all digitalized information such as texts, images, voice, and programs. It can be used for various applications; for example, when the user receives illegal information, he or she can trace the distribution route for locating the distributor of the illegal information, and take a proper action.

The time required for distribution of information existing in one information processing system, the distributed information amount, and the like are displayed in visual form, whereby the user can understand how the information was distributed, whereby he or she can know a point with a large information distribution amount, a point where information distribution is delayed, etc., and can take measures against it.

What is claimed is:

1. An information tracing system comprising:

distribution sensing means for sensing distribution of information, a size of the distributed information, and a distribution time of the information from a first information processing system of an information distribution source to a second information processing system of an information distribution destination;

distribution history storage means for adding the information distribution, the distributed information size, and the information distribution time sensed by said distribution sensing means to the distributed information for storing them;

calculation means for calculating a distribution route, size, and required time for distribution of the information from the information distribution, the distributed information size, and the information distribution time added to the information stored by said distribution history storage means;

display selection means for allowing an operator to specify whether or not either or both of the distributed information size and the required time for distribution of the information calculated by said calculation means are to be displayed; and display means for displaying the distribution route calculated by said calculation means and the distributed information size and the required time for distribution of the information related to the distribution route specified through said display selection means.

2. The information tracing system as claimed in claim 1, wherein said distribution sensing means senses the information distribution, the distributed information size, and the information distribution time, when information is sent from the first information processing system.

3. The information tracing system as claimed in claim 1, wherein said distribution sensing means senses the information distribution, the distributed information size, and the information distribution time, when information is received at the second information processing system.

4. The information tracing system as claimed in claim 1 wherein said distribution sensing means senses the information distribution, the distributed information size, and the information distribution time, when information is sent from the first information processing system and when information is received at the second information processing system.

5. The information tracing system as claimed in claim 1 further including:

means for editing information;

means for sensing edit executed by said edit means; and means for storing histories related to edit sensed by said edit sensing means, and wherein said calculation means further calculates an information change.

6. The information tracing system as claimed in claim 1, wherein the distributed information contains an information label which is a label for the information, and wherein said distribution history storage means further stores the information label as a history related to distribution.

7. The information tracing system as claimed in claim 1, wherein said second information processing system further includes:

means being responsive to distributed information for preparing an information label which is a label for the information, said distribution history storage means for storing the information label prepared by said information label preparation means as a history related to distribution.

8. The information tracing system as claimed in claim 1, wherein when information stored on an information recording medium is distributed, said distribution sensing means senses the information distribution, and wherein said distribution history storage means further stores a history related to the information together with the information and a medium label which is a label for the storage medium on the information recording medium.

9. An information tracing method comprising the steps of:

sensing distribution of information, a size of the distributed information, and a distribution time of the information from a first information processing system of an information distribution source to a second information processing system of an information distribution destination;

adding the information distribution, the distributed information size, and the information distribution time sensed to the distributed information for storing them;

calculating a distribution route, size, and required time for distribution of the information from the information distribution, the distributed information size, and the information distribution time added to the information stored;

allowing an operator to specify whether or not either or both of the distributed information size and the required time for distribution of the information calculated are to be displayed; and displaying the distribution route calculated and the distributed information size and the required time for distribution of the information related to the distribution route specified.

* * * * *